(12) United States Patent
Kataoka

(10) Patent No.: US 10,843,730 B2
(45) Date of Patent: Nov. 24, 2020

(54) LANE KEEPING TRAVELING SUPPORT APPARATUS

(71) Applicant: TOYOTA JIDOSHA KABUSHIKI KAISHA, Toyota-shi (JP)

(72) Inventor: Hiroaki Kataoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 15/818,901

(22) Filed: Nov. 21, 2017

(65) Prior Publication Data

US 2018/0154938 A1 Jun. 7, 2018

(30) Foreign Application Priority Data

Dec. 1, 2016 (JP) .................................. 2016-233902

(51) Int. Cl.
| | |
|---|---|
| *B62D 15/02* | (2006.01) |
| *B60W 30/12* | (2020.01) |
| *B60W 50/06* | (2006.01) |
| *B60W 10/20* | (2006.01) |
| *B60W 50/00* | (2006.01) |

(52) U.S. Cl.
CPC ........... *B62D 15/025* (2013.01); *B60W 30/12* (2013.01); *B60W 50/06* (2013.01); *B60W 10/20* (2013.01); *B60W 2050/0008* (2013.01); *B60W 2710/20* (2013.01); *B60W 2710/202* (2013.01)

(58) Field of Classification Search
None
See application file for complete search history.

(56) References Cited

U.S. PATENT DOCUMENTS

| | | | |
|---|---|---|---|
| 10,479,358 B2 * | 11/2019 | Kataoka | B62D 15/025 |
| 2012/0226392 A1 | 9/2012 | Kataoka | |
| 2015/0246687 A1 * | 9/2015 | Takeda | B62D 6/002 701/41 |
| 2016/0244056 A1 * | 8/2016 | Seguchi | F02D 17/04 |
| 2016/0272202 A1 * | 9/2016 | Inomata | B62D 5/0481 |
| 2019/0071079 A1 * | 3/2019 | Nishiguchi | B60R 21/01538 |

FOREIGN PATENT DOCUMENTS

WO WO 2011/064825 A1 6/2011

* cited by examiner

*Primary Examiner* — Nicholas K Wiltey
(74) *Attorney, Agent, or Firm* — Oblon, McClelland, Maier & Neustadt, L.L.P.

(57) ABSTRACT

A lane keeping traveling support apparatus includes a driving support ECU. The driving support ECU is configured to inform a driver that the LDA control is being performed by causing the driver to have uncomfortable feeling by a movement of a steering wheel and a vehicle behavior when the LDA control is performed. This function is achieved by enhancing responsiveness of the LDA control.

4 Claims, 12 Drawing Sheets

LANE KEEPING TRAVELING SUPPORT APPARATUS

BACKGROUND OF THE INVENTION

1. Field of the Invention

The present invention relates to a lane keeping traveling support apparatus which controls a steering assist torque in such a manner that a vehicle (own vehicle) does not deviate from a lane where the own vehicle is traveling.

2. Description of the Related Art

A traveling support apparatus, which has been conventionally known, recognizes lane markers such as a white line or a yellow line on a road by using a camera mounted on an own vehicle to control a steering assist torque in such a manner that the own vehicle travels at an appropriate position within a "traveling lane (lane) specified by the recognized lane markers" (for example, refer to WO 2011/064825). A lane keeping assist control and a lane departure prevention control are known as a typical control performed by such a traveling support apparatus.

When the traveling support apparatus performs the lane keeping assist control, for example, the traveling support apparatus detects the left and right white lines of the road by a camera sensor, and sets/determines a center line which is positioned at a central position between the left white line and the right white line as a target traveling line. Further, the traveling support apparatus supports/assists a steering operation of a driver by applying the steering assist torque to a steering mechanism such that a position of the own vehicle is kept in a vicinity of the target traveling line. It should be noted that such a lane keeping assist control is referred to as an "LKA (Lane Keeping Assist) control".

On the other hand, when the traveling support apparatus performs a lane departure prevention control, the traveling support apparatus generates a warning to the driver when the own vehicle is likely to deviate from the traveling lane, and supports the steering operation of the driver by applying the steering assist torque to the steering mechanism so as to prevent the own vehicle from deviating from the traveling lane.

It should be noted that such a lane departure prevention control is also referred to as an "LDA (Lane Departure Alert) control with a steering control" or simply an "LDA control".

SUMMARY OF THE INVENTION

The lane departure prevention control determines the steering assist torque by multiplying a "parameter (for example, a distance between the white line and the own vehicle) which changes according to a possibility of departure from the traveling lane" by a "control gain". Since one of purposes of the lane departure prevention control is to avoid an accident, it is necessary for the lane departure prevention control to quickly steer the own vehicle so that the own vehicle does not deviate from the traveling lane. Therefore, the control gain used by the lane departure prevention control is set to a relatively large value.

On the other hand, the lane keeping assist control determines the steering assist torque by multiplying a parameter such as a position, an angle, and the like of the own vehicle to the target traveling line by a control gain. Since one of purposes of the lane keeping assist control is to support/assist the driving (steering) operation of the driver such that the own vehicle travels along the target traveling line, a good steering feel is desired. Therefore, the lane keeping assist control is required to slowly steer the own vehicle as compared with the lane departure prevention control. Therefore, the control gain used by the lane keeping assist control is set to a relatively small value.

For this reason, for example, while the own vehicle is traveling on a sharp curved road, a case may occur where the lane keeping assist control cannot have the own vehicle travel along the target traveling line. In this case, the own vehicle may deviate from the traveling lane. Therefore, for example, when the own vehicle approaches the white line, the traveling support apparatus switches control modes of the driving support control from the lane keeping assist control to the lane departure prevention control. As a result, the traveling support apparatus can prevent the own vehicle from deviating from the traveling lane, or can reduce an amount of deviation of the own vehicle from the traveling lane.

However, when the traveling support apparatus switches the control modes of the driving support control from the lane keeping assist control to the lane departure prevention control so as to perform the lane departure prevention control, following problems may occur. That is, although the lane departure has been avoided owing to the lane departure prevention control, the driver may mistakenly recognize that the lane departure has been avoided owing to the lane keeping assist control. As a result, there is a possibility that the driver is overconfident about the ability of the lane keeping assist control (in other words, overestimates the ability of the lane keeping assist control).

The present invention has been made in order to solve the above-described problem. That is, one of objects of the present invention is to provide a lane keeping traveling support apparatus which can reduce the possibility that the driver overestimates the ability of the lane keeping assist control. Hereinafter, the lane keeping traveling support apparatus is also referred to as the "present invention apparatus".

The present invention apparatus comprises:
an electric motor (21) for applying a steering assist torque to a steering mechanism including a steering wheel of an own vehicle; and
a control unit (10) for selectively performing one of:
a lane keeping assist control for applying a steering assist torque to keep a traveling position of the own vehicle in the vicinity of a target traveling line to the steering mechanism by using the electric motor and
a lane departure prevention control.
The lane departure prevention control is a control:
for determining a steering assist torque to prevent the own vehicle from deviating from a traveling lane by multiplying a parameter by a control gain, the parameter having an absolute value which becomes larger as a possibility that the own vehicle deviates from the traveling lane increases, when a specific traveling situation occurs in which the own vehicle is likely to deviate outside of the traveling lane; and
for applying the determined steering assist torque to the steering mechanism by using the electric motor.
The control unit is configured:
to select, in accordance with a traveling situation of the own vehicle, one of a first operation mode (routines shown in FIGS. 6, 10, and 11) and a second operation mode (a routine shown in FIG. 7), and to work under the selected operation mode (refer to a "Yes" determination at each of steps 605 shown in FIGS. 6, 10, and 11, and a "Yes" determination at step 710 shown in FIG. 7).

The first operation mode is an operation mode under which the lane keeping assist control and the lane departure prevention control are permitted to be performed, and the lane departure prevention control is performed in place of the lane keeping assist control when the specific traveling situation occurs while the lane keeping assist control is being performed.

The second operation mode is an operation mode under which only the lane departure prevention control, out of the lane keeping assist control and the lane departure prevention control, is permitted to be performed, and the lane departure prevention control is performed when the specific traveling situation occurs.

The control unit is configured to make responsiveness of the lane departure prevention control under the first operation mode (step 650 shown in each of FIGS. 6, 10, 11) higher than responsiveness of the lane departure prevention control under the second operation mode by setting an absolute value of the control gain used in the lane departure prevention control performed under the first operation mode to a value larger than an absolute value of the control gain used in the lane departure prevention control performed under the second operation mode (step 645 shown in each of FIGS. 6, 10, 11).

According to the present invention apparatus, when the lane keeping assist control is replaced by the lane departure prevention control replaced so that the lane departure prevention control is performed under the first operation mode, a relatively rapid movement of the steering wheel and an unusual vehicle behavior occur to cause the driver to have a sudden feeling a sense of discomfort. Thus, the present invention apparatus can notify the driver that the lane departure prevention control in place of the lane keeping assist control is started and is being performed. Thereby, it is possible to have the driver recognize that the lane departure prevention control is being performed. As a result, it can prevent the driver from overestimating the LKA control function.

One of aspects of the present invention apparatus further comprises a display unit (70) for displaying an image representing an execution state of the lane keeping assist control or the lane departure prevention control,
wherein,
the control unit is configured:
to switch the image to be displayed on the display unit from a first image indicating that the lane keeping assist control is being performed to a second image indicating that the lane departure prevention control is being performed when the control unit performs the lane departure prevention control instead of the lane keeping assist control (step 650 shown in FIG. 6 after a "Yes" determination is made at each of steps 630 and 640 shown in FIG. 6); and
to continue to display the second image during a period during which the control unit is performing the lane departure prevention control.

The first image includes:
a first image portion (VT) representing a portion including a front end portion of a vehicle, positioned at a lower end of a central portion of an entire image,
a second image portion (WL) representing a left side lane marker, positioned at a left side of the first image portion (for example, the second image portion extends in a right oblique direction to represent the left side lane marker),
a third image portion (WL) representing a right side lane marker, positioned at a right side of the first image portion (for example, the third image portion extends in a left oblique direction to represent the right side lane marker),
a fourth image portion (BW) representing a left side wall, the fourth image portion being adjacent to the second image portion and extending upward from a left side position of the second image portion, and
a fifth image portion (BW) representing a right side wall, the fifth image portion being adjacent to the third image portion and extending upward from a right side position of the third image portion.

The second image includes the first image portion to the fifth image portion. In the second image, at least one of a color and a shape of one specified image portion of the fourth image portion and the fifth image portion is changed so as to be different from an image portion corresponding to the one specified image in the first image. The one specified image represents a side wall at a side of one of the right and left lane markers, which is determined to be a maker from which the own vehicle is about to deviate in the lane departure prevention control.

According to the above aspect, when the lane departure prevention control is performed instead of the lane keeping assist control under the first operation mode, the image to be displayed on the display unit is switched from the first image indicating that the lane keeping assist control is being performed to the second image (different from the first image) indicating that the lane departure prevention control is being performed. The second image is displayed as long as the lane departure prevention control is performed.

Thereby, a notification that appeals to the driver's vision is additionally given, the notification using the image that the lane departure prevention control is being performed after the switch-over from the lane keeping assist control to the lane departure prevention control. Thus, the aspect can more easily and certainly have the driver recognize that the lane departure prevention control is being performed. As a result, the aspect can reduce the possibility of causing the driver to overestimate the LKA control function.

Another aspect of the present invention apparatus further comprises an operation switch (50) to be operated to be in an ON state or in an OFF state to determine whether to permit the lane keeping assist control and the lane departure prevention control to be performed. The control unit is configured to have a state of the operation switch be in the OFF state (step 1010 shown in FIG. 10) from a time point at which the control unit terminates the lane departure prevention control under the first operation mode (step 660 shown in FIG. 10) so as not to permit the lane keeping assist control to be performed until the operation switch is again turned on to be in the ON state by a driver.

According to the above aspect, the lane keeping assist control is not performed in the period from immediately after the lane departure prevention control performed under the first operation mode is terminated until the driver turns on the operation switch again to the ON state. Thus, in that period, the driver has to perform a handle operation to accurately impart a relatively large torque to the steering wheel by himself/herself in order to have the own vehicle travel in the lane (or travel in the vicinity of a center of the lane). Therefore, the above aspect can cause the driver to have a sense of discomfort so as to notify the driver that the lane departure prevention control has been terminated. As a result, the aspect can have the driver recognize that the lane departure prevention control has been terminated. Thereby, the function of the lane departure prevention control can be grasped more accurately. The aspect can further reduce the possibility that the driver overestimates the lane keeping assist control.

In one of aspects of the present invention apparatus, the control unit is configured in such a manner that the control unit does not permit the lane keeping assist control to be performed for a predetermined period of time (step 660 shown in FIG. 12) from a time point (step 1110 shown in FIG. 11) immediately after terminating the lane departure prevention control under the first operation mode.

According to the above aspect, the lane keeping assist control is not performed for the predetermined period of time from immediately after the lane departure prevention control performed under the first operation mode is terminated. Thus, the driver has to perform a handle operation to accurately impart a relatively large torque to the steering wheel by himself/herself in order to have the own vehicle travel in the lane (or travel in the vicinity of a center of the lane). Therefore, the above aspect can cause the driver to have a sense of discomfort so as to notify the driver that the lane departure prevention control has been terminated. As a result, the aspect can have the driver recognize that the lane departure prevention control has been terminated. Thereby, the function of the lane departure prevention control can be grasped more accurately. The aspect can further reduce the possibility that the driver overestimates the lane keeping assist control.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE PREFERRED EMBODIMENT

Figure 1:
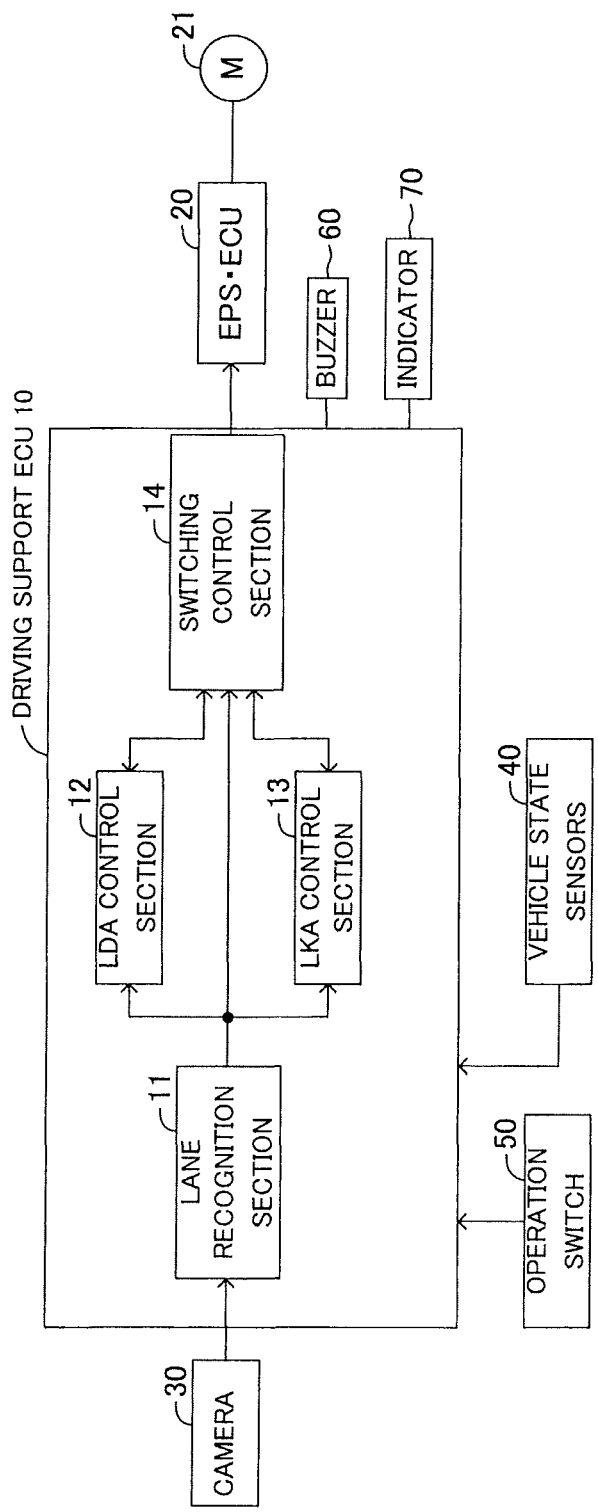
FIG. 1 is a schematic system configuration diagram of a lane keeping traveling support apparatus according to a first embodiment of the present invention.

A lane keeping traveling support apparatus according to each of embodiments of the present invention will be described below, referring to drawings. It should be noted that, throughout all of the drawings, the same reference numerals are assigned to the same or corresponding parts.

First Embodiment

<Construction>

A lane keeping traveling support apparatus according to the first embodiment of the present invention (hereinafter, referred to as a "first apparatus") is applied to a vehicle. As shown in FIG. 1, the first apparatus comprises a driving support ECU 10, an electric power steering ECU 20, a camera 30, vehicle state sensors 40, an operation switch 50, a buzzer 60, and an indicator (display unit) 70. Hereinafter, the electric power steering ECU 20 is referred to as an "EPS·ECU 20".

It should be noted that the ECU is an abbreviation of an Electric Control Unit, and is an electronic control circuit having a microcomputer including a CPU, a ROM, a RAM, an interface, and the like, as its main components. The CPU realizes various functions by executing instructions (routines) stored in a memory (ROM).

Focusing on functions of the microcomputer, the driving support ECU 10 is roughly divided into a lane recognition section 11, a lane departure prevention control section 12, a lane keeping assist control section 13, and a switching control section 14. The driving support ECU 10 calculates a control amount (a target torque) based on the vehicle state amount detected by the vehicle state sensors 40. The driving support ECU 10 transmits the control amount as an instruction to the EPS·ECU 20.

The EPS·ECU 20 is a control unit of an electric power steering apparatus, and mainly includes a microcomputer and a motor drive circuit. The EPS·ECU 20 obtains a steering torque applied to a steering wheel (not shown) by a driver, using a steering torque sensor provided on a steering shaft. The EPS·ECU 20 drives and controls an assist motor 21 which is an electric motor based on the obtained steering torque. Thereby, the EPS·ECU 20 applies the steering torque to a steering mechanism to assist a steering operation of the driver.

The EPS·ECU 20 is connected with the driving support ECU 10. When the EPS·ECU 20 receives a steering command sent from the driving support ECU 10, the EPS·ECU 20 drives the assist motor 21 according to the control amount (the target torque) specified by the steering command to generate a steering assist torque. This steering assist torque is different from the steering assist torque to lighten the steering wheel operation by the driver. This steering assist torque represents a torque applied to the steering mechanism based on the steering command transmitted from the driving support ECU 10 irrespective of a steering wheel operating force of the driver.

The vehicle state sensors 40 include a vehicle speed sensor for detecting the vehicle speed of the own vehicle, a yaw rate sensor for detecting a yaw rate of the own vehicle, a lateral acceleration sensor for detecting the lateral acceleration of the own vehicle, and the like. The vehicle state sensors 40 are used to acquire information necessary for calculating the target torque.

The lane recognition section 11 is connected with the camera 30. The camera 30 photographs (takes an image of) an area ahead of the vehicle and transmits an image data acquired by photographing to the lane recognition section 11. The lane recognition section 11 recognizes (detects) lane markers such as a white line, a yellow line, or the like on a road by analyzing the image data transmitted from the camera 30. Hereinafter, the lane marker is referred to as a "white line" for convenience.

Figure 2:
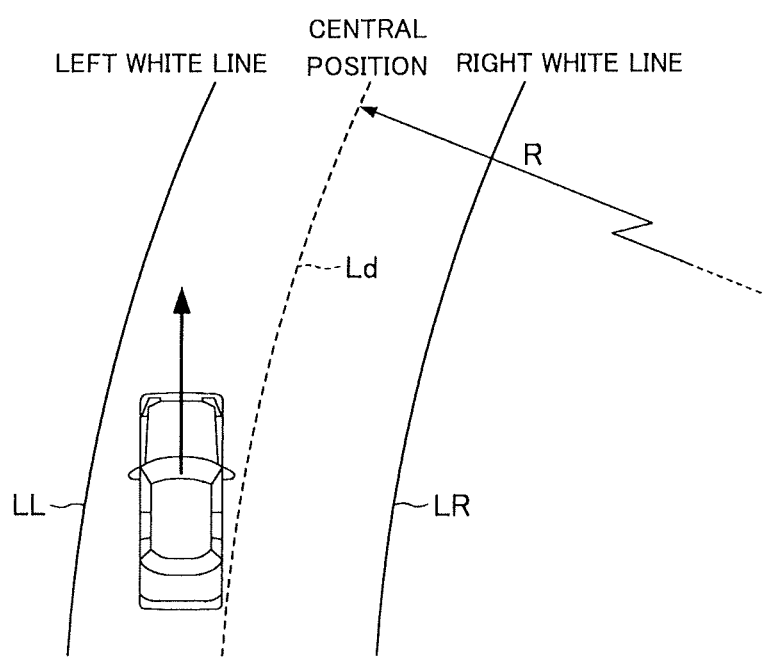
FIG. 2 is a plan view showing left and right white lines LL and LR, a target traveling line Ld, and a curve radius R.

As shown in FIG. 2, the lane recognition section 11 recognizes the left white line LL and the right white line LR, and sets/determines a center line which is positioned at the center between the left white line LL and the right white line LR as a target traveling line Ld. Further, the lane recognition section 11 calculates a curve radius R of the target traveling line Ld. It should be noted that the target traveling line Ld is not necessarily set at the central position between the left and right white lines. The target traveling line Ld may be set at a position shifted from the center position in the left direction or the right direction by a predetermined distance.

Figure 3:
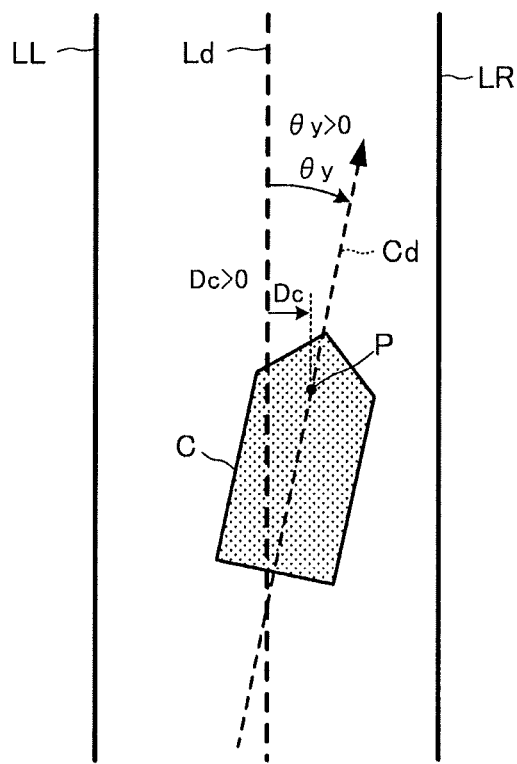
FIG. 3 is a plan view showing a center distance Dc and a yaw angle θy, serving as lane information for a lane keeping assist control.

The lane recognition section 11 calculates a position of the own vehicle and a direction of the own vehicle in the traveling lane defined by the left white line LL and the right white line LR. More specifically, the lane recognition section 11 calculates a "center distance Dc and a yaw angle $\theta y$" defined below and shown in FIG. 3. It should be noted that a reference point P of the own vehicle C is the central position between the left and right front wheels on the axle of the left and right front wheels of the own vehicle C.

The center distance Dc: the center distance Dc is a distance in a road width direction (lateral direction) between the reference point P and the target traveling line Ld. In the present embodiment, the center distance Dc is "0" when the reference point P is on the target traveling line Ld. The center distance Dc is a positive value when the reference point P is on the right side of the target traveling line Ld. The center distance Dc is a negative value when the reference point P is on the left side of the target traveling line Ld.

The yaw angle $\theta y$: the yaw angle $\theta y$ is an angle (deviation angle) formed between the direction of the target traveling line Ld and the direction Cd in which the own vehicle C heads, and is an acute angle from $-90°$ to $+90°$. In the present embodiment, the yaw angle $\theta y$ is "0" when the direction Cd (the own vehicle C heading direction) coincides with the direction of the target traveling line Ld. The yaw angle $\theta y$ is a positive value when the direction Cd of the own vehicle C inclines in the clockwise direction (the direction shown in FIG. 3) with respect to the direction of the target traveling line Ld. The yaw angle $\theta y$ is a negative value when the direction Cd of the own vehicle C inclines in the counterclockwise direction (the direction shown in FIG. 4) with respect to the direction of the target traveling line Ld.

Figure 4A:
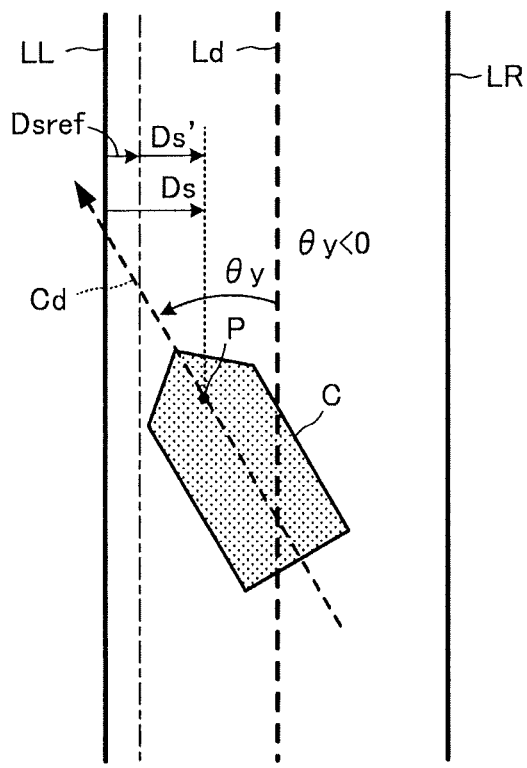
FIG. 4A is a plan view showing a side distance Ds and a yaw angle θy, serving as lane for a lane departure prevention control is performed.
Figure 4B:
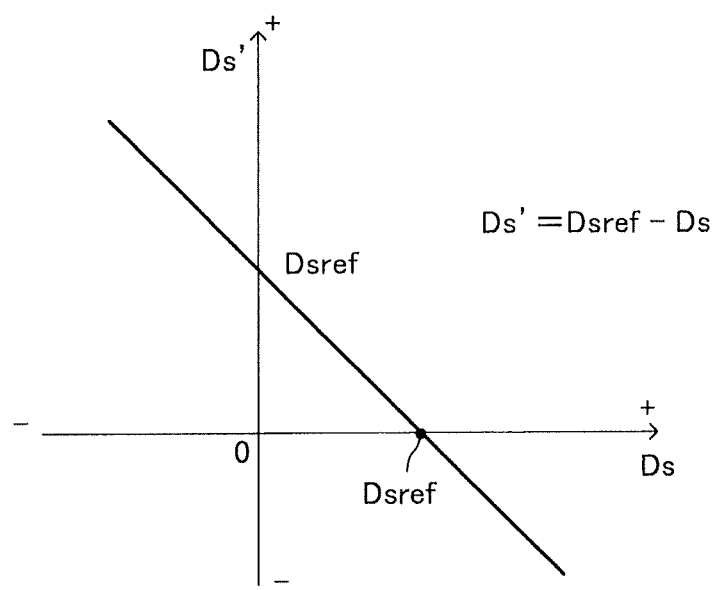
FIG. 4B is a graph showing the relationship between a deviation indicator distance Ds' and the side distance Ds.

Further, the lane recognition section 11 calculates a side distance Ds defined below and shown in FIG. 4A.

The side distance Ds: the side distance Ds is a distance in the road width direction between the "reference point P" and a "white line to which the reference point P of the own vehicle C is closer among the right white line LR and the left white line LL". Hereinafter, the white line to which the reference point P of the own vehicle C is closer is referred to as an "objective (or target) white line" for convenience. In the example shown in FIG. 4A, the objective white line is the left white line LL. In the present embodiment, the side distance Ds is "0" when the reference point P is on the objective white line. The side distance Ds is a positive value when the reference point P is inside the traveling lane with respect to the objective white line (at a position in the center side of the road). The side distance Ds is a negative value when the reference point P is outside the traveling lane with respect to the objective white line (at a position in the side departing from the road).

The values (Dc, Ds, $\theta y$, R) calculated by the lane recognition section 11 are referred to as lane information.

The lane departure prevention control section 12 performs the lane departure prevention control. The lane departure prevention control is also referred to as an "LDA control". The LDA control is a control for applying the steering assist torque to the steering mechanism in such a manner that the own vehicle does not deviate from the traveling lane when the own vehicle is about to deviate from the traveling lane to the outside of the traveling lane, so as to support the steering operation of the driver with alerting the driver. Hereinafter, the lane departure prevention control section 12 is referred to as an "LDA control section 12".

The LDA control section 12 receives the lane information (Ds, $\theta y$, R) calculated by the lane recognition section 11 to calculate a target torque TLDA for preventing the own vehicle from deviating from the traveling lane to the outside of the traveling lane. Hereinafter, the target torque TLDA is referred to as an "LDA target torque TLDA". In the present embodiment, the LDA target torque TLDA is a positive value when the LDA target torque TLDA is a torque to generate the yaw rate of the own vehicle C which is generated when the own vehicle C turns left. The LDA target torque TLDA is a negative value when the LDA target torque TLDA is a torque to generate the yaw rate of the own vehicle C which is generated when the own vehicle C turns right. In this regard, the same applies to an "LKA target torque TLKA" which will be described later.

When and after an LDA calculation start condition described below is satisfied, the LDA control section 12 calculates the LDA target torque TLDA (specifically, a first LDA target torque TLDA1 and a second LDA target torque TLDA2, described later) using a following formula (1) until the LDA calculation termination condition is satisfied. When the LDA control section 12 does not calculate the LDA target torque TLDA using the formula (1), the LDA control section 12 provisionally sets the LDA target torque TLDA to "0".

The LDA calculation start condition: the LDA calculation start condition is a condition which is satisfied when the side distance Ds becomes equal to or shorter/smaller than a reference side distance Dsref.

The LDA calculation termination condition: the LDA calculation termination condition is a condition which is satisfied when all of the following conditions are satisfied.

The side distance Ds is longer/greater than the reference side distance Dsref.

The yaw angle $\theta y$ is equal to or greater than a "negative switching determination threshold $\theta yrefF$" when the objective white line is the left white line LL, or the yaw angle $\theta y$ is smaller than or equal to a "positive switching determination threshold value θyrefS" when objective white line is the right white line LR.

Each of the negative switching determination threshold value θyrefF and the positive switching determination threshold value θyrefS is set to an angle which allows the direction of the own vehicle C to be regarded as being roughly parallel (substantially parallel) to the target lane (target traveling line) Ld.

$$TLDA = K1 \cdot (V^2/R) + K2 \cdot Ds' + K3 \cdot \theta y \tag{1}$$

Each of K 1, K 2, and K 3 is a control gain.

K1 is set to a positive value (k1>0) when the traveling lane curves to the left, and is set to a negative value (−k1) when the traveling lane curves to the right.

K 2 is set to a positive value (k2>0) when the objective white line is the right white line LR, and is set to a negative value (−k2) when the objective white line is the left white line LL.

K 3 is set to a positive value.

V is the vehicle speed of the own vehicle detected by the vehicle speed sensor.

R is the curve radius (R>0) of the target traveling line Ld calculated by the lane recognition section 11.

θy is the above-described yaw angle.

Ds' is a departure indicator distance which is a value (Ds'=Dsref−Ds) obtained by subtracting the side distance Ds from the preset reference side distance Dsref. The departure indicator distance Ds' has a relationship shown in a graph of FIG. 4B with respect to the side distance Ds.

The first term on the right side of the formula (1) is a torque component (feedforward control amount with respect to the curve radius R) determined according to the curve radius R of the road (target traveling line Ld) and the vehicle speed V. The torque component acts in a feedforward control manner with respect to the curve radius R. That is, the first term on the right side of the formula (1) is the torque component to have the own vehicle C travel according to a curvature of the target traveling line Ld.

The second term on the right side of the formula (1) is a torque component which acts in a feedback control manner so that the own vehicle C does not excessively approach the white line (in particular, the objective white line) in the road width direction, or so that the own vehicle C travels at the inner side (road center side) with respect to the objective white line after the own vehicle C has deviated from the traveling lane. The second term is a feedback control amount with respect to the side distance Ds or with respect to the departure indicator distance Ds'.

The third term on the right side of the formula (1) is a torque component (feedback control amount with respect to the yaw angle θy) which acts in a feedback control manner so as to reduce a magnitude |θy| of the yaw angle θy (i.e., so as to reduce a deviation of the direction of the own vehicle with respect to the target traveling line Ld).

It should be noted that the LDA control section 12 may obtain/acquire the LDA target torque TLDA by adding a value K4·(γ*−γ) to the right side of the above formula (1) (i.e., TLDA=K1·(V²/R)+K2·Ds'+K3·θy+K4·(γ*−γ)). Here, the γ* is the target yaw rate, and is a value determined based on the sum of the first term of the right side, the second term of the right side, and the third term of the right side. The γ* is the yaw rate to be achieved (realized) based on the sum of the first term of the right side, the second term of the right side and the third term of the right side. The γ is an actual yaw rate of the own vehicle C detected by the yaw rate sensor. Therefore, the value K4·(γ*−γ) is a torque component (feedback control amount with respect to the yaw rate) which acts in a feedback control manner so as to reduce a deviation between the target yaw rate γ* and the actual yaw rate γ.

Here, the following situation is considered, where the own vehicle C is about to deviate from the right white line LR of the traveling lane (in other words, the side distance Ds has become equal to or smaller than the reference side distance Dsref) when the own vehicle C is traveling at a constant speed V along the target traveling line Ld having a constant curve radius R which is excessively small with respect to the vehicle speed V. In this case, since the control gain K2 is a positive value k2 and the departure indicator distance Ds' is a positive value, the second term (K 2·Ds') on the right side of the formula (1) is a positive value. Furthermore, the control gain K3 is a positive value, and the yaw angle θy is a positive value since the own vehicle is about to depart from the right white line LR. Thus, the third term (K3·θy) on the right side of the formula (1) is also a positive value. In addition, at the beginning of the departure tendency, the deviation indicator distance Ds' and the yaw angle θy increase. That is, the deviation indicator distance Ds' and the yaw angle θy can be said to be parameters whose absolute value increases as the possibility that the own vehicle C deviates from the traveling lane increases.

Meanwhile, the LDA control section 12 calculates the LDA target torque TLDA every time a predetermined calculation cycle time elapses. Therefore, as the absolute values of the control gain K2 and the control gain K3 (that is, the control gains each of which is multiplied by the parameter whose absolute value becomes larger as the possibility that the own vehicle C deviates from the traveling lane increases) are larger, a change amount of the target torque TLDA per unit time are greatly increased, so that a responsiveness of the LDA control can be enhanced.

The LDA control section 12 supplies the target torque TLDA, which is the calculation result, to the switching control section 14.

The lane keeping assist control section 13 performs the lane keeping assist control. The lane keeping assist control is referred to as an "LKA control". The LKA control is a control for applying the steering assist torque to the steering mechanism in such a manner that a traveling position of the own vehicle C is kept in the vicinity of the target traveling line Ld, so as to support the steering operation of the driver. Hereinafter, the lane keeping assist control section 13 is referred to as an "LKA control section 13".

The LKA control section 13 receives the lane information (Dc, θy, R) calculated by the lane recognition section 11 to calculate a target torque TLKA (hereinafter referred to as an "LKA target torque TLKA") to have the own vehicle C travel along the target traveling line Ld.

The LKA control section 13 calculates the LKA target torque TLKA using a following formula (2).

$$TLKA = K11 \cdot (V^2/R) + K12 \cdot Dc + K13 \cdot \theta y \tag{2}$$

Each of K11, K12, and K13 is control gain.

K11 is set to a positive value (k11>0) when the traveling lane curves to the left, and is set to a negative value (−k11) when the traveling lane curves to the right.

K12 is set to a positive value.

K13 is set to a positive value.

The first term on the right side of formula (2) is a torque component (feedforward control amount with respect to the curve radius R) determined according to the curve radius R of the road (target traveling line Ld) and the vehicle speed V. The torque component acts in a feedforward control manner with respect to the curve radius R. That is, the first term on the right side is a torque component to have the own vehicle C travel according to a curvature of the target traveling line Ld.

The second term on the right side of the formula (2) is a torque component (feedback control amount with respect to the center distance Dc) which acts in a feedback control manner so as to reduce a magnitude of the center distance Dc which is a deviation (position deviation) of the position of the own vehicle in the road width direction from the target traveling line Ld. The third term on the right side of the formula (2) is a torque component (feedback control amount with respect to the yaw angle $\theta y$) which acts in a feedback control manner so as to reduce the magnitude $|\theta y|$ of the yaw angle $\theta y$ (that is, so as to reduce the deviation of the direction of the own vehicle with respect to the target traveling line Ld).

Since the LKA control is a control to support/assist a driving operation of the driver so that the own vehicle C travels along the target traveling line Ld, it is required that the steering feel when the LKA control is performed is good and comfortable. For this reason, the steering assist torque (LKA target torque TLKA) is set to a value which causes a slowl/moderate steering. On the other hand, the LDA control is a control to support/assist the steering operation of the driver by applying the steering assist torque to the steering mechanism so that the own vehicle C does not deviate from the traveling lane when the own vehicle C is about to deviate from the traveling lane (to the outside of the objective white line). Therefore, the steering assist torque (the LDA target torque TLDA) is set to a value which causes a relatively steep/rapid steering.

For these reasons, a change rate of the target value (the target torque) of the steering assist torque (i.e., a change amount in the target torque per unit time) in the LDA control is set to be larger than that in the LKA control. That is, the absolute value of the control gain used in the LDA control is set to be larger than the control gain used in the LKA control. In particular, with respect to the control gains K2 and K12 of the feedback control term of the positional deviation are set to have a relationship of $|K2|>K12$, and the control gains K3 and K13 of the feedback control term of the direction deviation are set to have a relationship of $K3>K13$.

Further, when the LDA control or the LKA control is performed, lateral acceleration is generated in the own vehicle C. The first apparatus imposes an upper limit on the lateral acceleration Gy. That is, according to the LDA control, the maximum value of the lateral acceleration Gy allowed to be generated is a maximum lateral acceleration GyLDA max. According to the LKA control, the maximum value of the lateral acceleration Gy allowed to be generated is a maximum lateral acceleration GyLKA max. Therefore, the LDA target torque TLDA is determined in such a manner that an actual lateral acceleration Gy does not exceed the maximum lateral acceleration GyLDA max. Hereinafter, an upper limit value of the LDA target torque TLDA restricted by the maximum lateral acceleration GyLDA max is referred to as an "upper limit torque TLDA max". Similarly, the LKA target torque TLKA is determined in such a manner that the actual lateral acceleration Gy does not exceed the maximum lateral acceleration GyLKA max. Hereinafter, an upper limit value of the target torque TLKA restricted by the maximum lateral acceleration GyLKA max is referred to as an "upper limit torque TLKA max". In the first apparatus, the upper limit torque TLDA max is set to a value larger than the upper limit torque TLKA max.

The LKA control section 13 supplies the LKA target torque TLKA, which is the calculation result, to the switching control section 14.

The switching control section 14 receives the LDA target torque TLDA, the LKA target torque TLKA, and the lane information (Dc, Ds, $\theta y$, R) every time the predetermined calculation cycle/period elapses. The first apparatus does not perform the LDA control and the LKA control simultaneously. Therefore, the switching control section 14 has a function to switch controls (LDA control and LKA control) to be performed based on the LDA target torque TLDA, the LKA target torque TLKA, and the lane information. The switching control section 14 determines the control (LDA control or LKA control) to be finally performed based on the LDA target torque TLDA, the LKA target torque TLKA, and the lane information, and transmits to the EPS·ECU 20 the steering command representing the control amount (target torque) calculated by the control unit (the LDA control section 12 or the LKA control section 13) that performs the determined control.

The operation switch 50 is provided on a steering column of the own vehicle. The operation switch 50 moves to an ON position when it is pushed downward by the driver, and remains at the ON position unless the driver operates it thereafter. Further, the operation switch 50 moves to an OFF position when it is pushed upward by the driver from the ON position, and remains at the OFF position unless the driver operates it thereafter. The operation switch 50 is an operation device which the driver operates in order to select whether or not to perform a lane keeping traveling support (lane keeping assist) in which either one of the LDA control and the LKA control is performed. The driving support ECU 10 recognizes that a state of the operation switch 50 is in an ON state when the operation switch 50 is at the ON position, and recognizes that the state of the operation switch 50 is in an OFF state when the operation switch 50 is at the OFF position.

It should be noted that the operation switch 50 may be configured to move downward only while the driver is pushing the operation switch 50 downward from a reference position, and automatically returns to the reference position when the driver does not touch the operation switch 50. In this case, when the operation switch 50 is pressed downward while it is recognized that the state of the operation switch 50 is at the OFF position, the driving support ECU 10 recognizes that the state of the operation switch 50 has changed to the ON position. Thereafter, even if the operation switch 50 returns to the reference position, the driving support ECU 10 maintains the recognition thereof. Furthermore, the driving support ECU 10 recognizes that the state of the operation switch 50 has changed to the OFF position when the operation switch 50 is pressed downward while the driving support ECU 10 recognizes that the state of the operation switch 50 is at the ON position. Thereafter, even if the operation switch 50 returns to the reference position, the driving support ECU 10 maintains the recognition thereof.

Although illustration and detailed description are omitted, the first apparatus is capable of performing the well-known trailing Inter-vehicle (distance) control (hereinafter referred to as ACC: Adaptive Cruise Control). The own vehicle is provided with an ACC operation switch (not shown) for enabling the driver to select whether to perform the ACC control. When the ACC operation switch is set to an ON position, the ACC control is performed. When the ACC operation switch is set to an OFF position, the ACC control is not performed. It should be noted that the ACC control includes both a trailing (following-up) control and a constant speed control. The trailing control is a control for maintaining the inter-vehicle distance between the own vehicle and a target vehicle at a predetermined distance when the target vehicle to be followed/trailed by the own vehicle is present ahead of the own vehicle. The constant speed control is a control for having the own vehicle travel at a predetermined speed when a vehicle to be trailed is not present ahead of the own vehicle.

The buzzer 60 and the display unit 70 are connected to the driving support ECU 10. The buzzer 60 is blown in accordance with a command from the driving support ECU 10, thereby alerting the driver. An operation state of the lane keeping traveling support is displayed on the display unit 70 in accordance with a command from the driving support ECU 10. It should be noted that the display unit 70 is a display unit that displays an image according to the command from the driving support ECU 10. Specifically, the display unit 70 is either one of a multifunction display and a head-up display.

<Outline of Operation>

The driving support ECU 10 of the first apparatus recognizes that the operation switch 50 is in the ON state as a result of depression of the operation switch 50 to perform the lane keeping traveling support (lane keeping assist) by performing either one of the LDA control and the LKA control. In this case, the driving support ECU 10 works under either one of a following first operation mode and a second operation mode, according to operation conditions.

The first operation mode: an operation mode for performing the LKA control or the LDA control.

The second operation mode: an operation mode for performing the LDA control.

The operating condition for the driving support ECU 10 to work under the first operation mode is as follows.

The ACC control is being performed, and the vehicle speed of the own vehicle is equal to or higher than a predetermined vehicle speed.

The operating condition for the driving support ECU 10 to work under the second operation mode is as follows.

The ACC control is not being performed, and the vehicle speed of the own vehicle is equal to or higher than the predetermined vehicle speed.

It should be noted that the predetermined vehicle speed can arbitrarily be set at a speed suitable for the operating conditions. Further, the operating conditions are not limited to the above-described conditions. For example, a condition that a set vehicle speed of the ACC control is equal to or higher than a predetermined vehicle speed may be added to the operation conditions.

When the driving support ECU 10 is working under the first operation mode, the driving support ECU 10 switches between the LKA control and the LDA control according to a traveling situation of the own vehicle to perform either one of the LKA control and the LDA control. When the driving support ECU 10 switches the controls from the LKA control to the LDA control while performing the LKA control, it raises a responsiveness of the LDA control as compared to a responsiveness of the LDA control performed under the second operation mode.

That is, the change rate of the target torque in the LDA control under the first operation mode is set to be larger than that of the target torque in the LDA control under the second operation mode. Specifically, each of the absolute values of the control gains of the LDA control under the first operation mode is set be larger than the control gain of the LDA control under the second operation mode. In particular, with regard to the control gain $K2$ for the feedback control term of the positional deviation, it is necessary to set a relationship of $K2a > K2b$. With regard to the control gain $K3$ for the feedback control term of the direction deviation, it is necessary to set a relationship of $K3a > K3b$. It should be noted that $K2a$ and $K3a$ are control gains used in the LDA control under the first operation mode, and $K2b$ and $K3b$ are control gains used in the LDA control under the second operation mode.

When the driving support ECU 10 is working under the second operation mode, the driving support ECU 10 performs the LDA control in accordance with a driving situation of the own vehicle. When the driving support ECU 10 is working under the second operation mode, the driving support ECU 10 does not perform the LKA control. That is, when the driving support ECU 10 is working under the second operation mode, the driving support ECU 10 performs only the LDA control in accordance with the driving state/situation of the own vehicle. The change rate of the target torque (the change amount of the target torque per unit time) in the LDA control under the second operation mode is smaller than the change rate of the target torque of the LDA control under the first operation mode.

The responsiveness (strength of control) of the LDA control performed under the second operation mode has been designed/determined in such a manner that the steering angular velocity (a movement of the steering wheel) and a yaw rate gradient (change rate of the yaw rate, or the vehicle behavior) at the time of performing the steering control are values that do not cause the driver to have a sudden feeling a sense of discomfort. The responsiveness which does not cause the driver to have a sudden feeling a sense of discomfort is a responsiveness where the steering angular velocity and the yaw rate gradient are equal to or lower than those achieved when the driver normally performs the steering operation to prevent the own vehicle from deviating from the traveling lane. The steering angular velocity and the yaw rate gradient can be set to be arbitrary values determined based on specific values (mean values) obtained when the driver normally starts to operate the steering wheel to prevent the own vehicle from departing form the lane from the same position as a position from which the the LDA control starts under an assumption that a traveling condition are the same as each other.

When the driving support ECU 10 is working under the second operation mode, the driving support ECU 10 performs the LDA control as follows. When an operating condition for starting the LDA control is satisfied, the LDA control section 12 supplies the LDA target torque TLDA (hereinafter, also referred to as an "LDA target torque TLDA2") calculated using the control gain of the LDA control under the second operation mode to the target switching section 14. The target switching section 14 transmits the steering command representing the LDA target torque TLDA2 supplied from the LDA control section 12 to the EPS·ECU 20. Thereby, the driving support ECU 10 performs the LDA control using the LDA target torque TLDA 2 so as not to cause the driver to have the sudden feeling a sense of discomfort.

On the other hand, the responsiveness of the LDA control performed under the first operation mode has been designed/determined in such a manner that the steering angular velocity (the movement of the steering wheel) and the yaw rate gradient (the vehicle behavior) at the time of performing the steering control are values that cause the driver to have a sudden feeling a sense of discomfort. The responsiveness which causes the driver to have a sudden feeling a sense of discomfort is a responsiveness where the steering angular velocity (the movement of the steering wheel) and the yaw rate gradient (the vehicle behavior) exceed those achieved when the driver normally performs the steering operation to prevent the own vehicle from deviating from the traveling lane.

Figure 5:
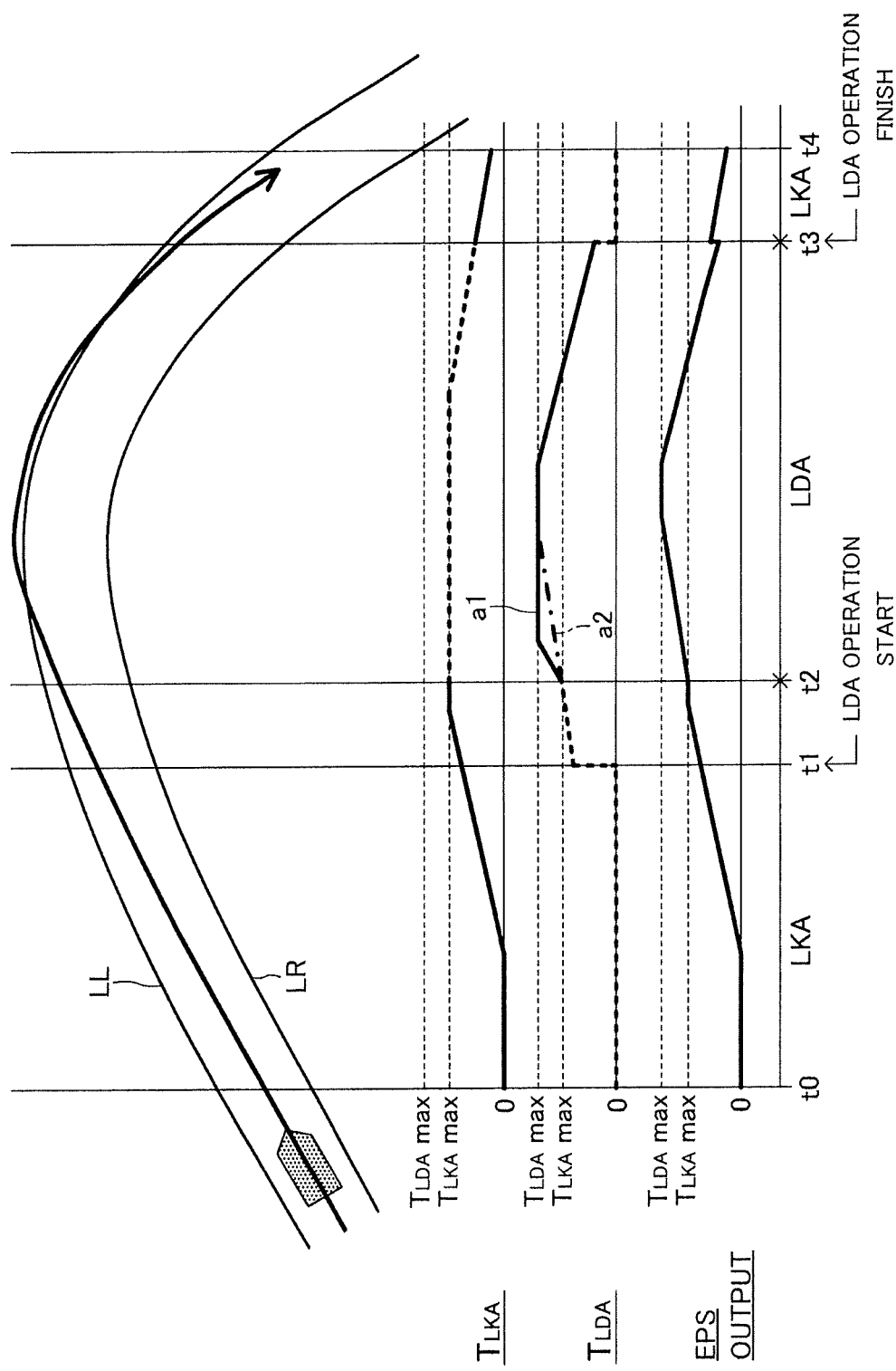
FIG. 5 is a graph showing relationship between a traveling position of an own vehicle and target torques.

FIG. 5 is a graph showing a relationship between the traveling position of the own vehicle and the target torques, when the driving support ECU 10 is working under the first operation mode. Regarding the torque waveforms in the figure, the upper section shows the LKA target torque TLKA, the middle section shows the LDA target torque TLDA, and the lower section shows the target torque finally commanded to the EPS·ECU 20.

It is assumed that the driving support ECU 10 is working under the first operation mode during a period (period from time t0 to time t4) in which the own vehicle travels on a road section including the curve section shown in FIG. 5. When the driving support ECU 10 is in the first operation mode, the driving support ECU 10 switches between the LKA control and the LDA control according to the traveling situation of the own vehicle to perform either one of the LKA control and the LDA control.

When the driving support ECU is working under the first operation mode, the LKA control section 13 calculates the LICA target torque TLKA and supplies the LICA target torque TLKA to the target switching section 14. Therefore, the LKA target torque TLKA is supplied to the target switching section 14 during the period from the time t0 to the time t4.

During a period in which an operation start condition of the LDA control (a condition for starting the calculation of the target torque) is not satisfied, that is, in the period from the time t0 to a time point immediately before the time t1 for which the own vehicle is traveling in the vicinity of the center of the traveling lane, the driving support ECU 10 performs the LKA control. In this case, the target switching section 14 transmits the steering command representing the LKA target torque TLKA supplied from the LKA control section 13 to the EPS·ECU 20. Thereby, the driving support ECU 10 performs the LKA control.

When the operation start condition of the LDA control becomes satisfied at the time t1 at which the own vehicle starts to enter the curve section, the LDA control section 12 supplies the LDA target torque TLDA2 calculated by using the same control gain as the LDA control under the second operation mode to the target switching section 14.

The target switching section 14 transmits the LDA target torque TLDA2 supplied from the LDA control section 12 or the LKA target torque TLKA supplied from the LKA control section 13, whichever is larger, to the EPS·ECU 20 as the steering command. At the time t1, the LKA target torque TLKA is larger than the LDA target torque TLDA 2. Therefore, the target switching section 14 transmits the steering command representing the LKA target torque TLKA to the EPS·ECU 20. Thereby, the driving support ECU 10 performs the LKA control. That is, the LKA control which was being performed at the time point immediately before the time t1 is continuously performed even at the time t1.

Similarly, the driving support ECU 10 performs the LKA control during the period from the time point immediately after the time t1 to a time point immediately before the time t2 at which the LKA target torque TLKA becomes smaller than the LDA target torque TLDA 2. That is, the LKA control which was being performed at the time t1 is continuously performed until the time point immediately before the time t2.

When the LKA target torque TLKA becomes smaller than the LDA target torque TLDA2 at the time t2 at which the own vehicle is traveling at the point just before the curve, the driving support ECU 10 prohibits the LKA control and performs the LDA control. In this case, the LDA control section 12 supplies the LDA target torque TLDA (hereinafter, also referred to as a "target torque TLDA1") which is indicated by a solid line a1 and calculated with the control gains of the LDA control under the first operation mode to the target switching section 14. The change rate (gradient) of the LDA target torque TLDA1 is greater than the change rate (gradient) of the LDA target torque TLDA2 which is indicated by the alternate long and short dashed line a2 and corresponds to the target torque when the LDA control under the second operation mode is performed. According to the LDA control based on the LDA target torque TLDA1, the movement of the steering wheel (the steering angular velocity) and the vehicle behavior (the yaw rate gradient) at the time of performing the steering control cause the driver to have the sudden feeling a sense of discomfort. Thereby, it is possible to inform the driver that the LDA control is being performed after the LKA control is switched to the LDA control. In other words, this switching can have the driver recognize that the LDA control is being performed.

The target switching section 14 transmits the steering command representing the LDA target torque TLDA1 to the EPS·ECU 20. Thereby, the driving support ECU 10 switches controls from the LKA control to the LDA control, and starts performing the LDA control.

The LDA control under the first operation mode continues to be performed until a termination condition of the LDA control is satisfied. While the LDA control is being performed, the target switching section 14 transmits the steering command representing the LDA target torque TLDA1 to the EPS·ECU 20 regardless of whether the LDA target torque TLDA1 is larger (or smaller) than the LKA target torque TLKA.

During a period from the time point immediately after the time t2 at which the LDA control is started to a time point immediately before time t3 at which the own the own vehicle is traveling at an end point of the curve section, the target switching section 14 transmits the steering command representing the LDA target torque TLDA 1 to the EPS·ECU 20. Thereby, the driving support ECU 10 performs the LDA control.

When the termination condition of the LDA control is satisfied at the time t3 at which the own vehicle is traveling at the end point of the curve section, the LDA control section 12 stops calculating the LDA target torque TLDA1 to stop supplying the LDA target torque TLDA1 to the target switching section 14. Thereafter, the target switching section 14 transmits the steering command representing the LKA target torque TLKA supplied from the LKA control section 13 to the EPS·ECU 20. Thereby, the driving support ECU 10 switches the LDA control to the LKA control at the time t3, and performs the LKA control during the period from the time t3 to the time t4.

<Specific Operation>

Next, specific operations of the first apparatus will be described. The CPU of the driving support ECU 10 (hereinafter, simply referred to as the "CPU") performs each of a first operation mode routine and a second operation mode routine shown by the flowcharts of FIG. 6 and FIG. 7, respectively.

Figure 6:
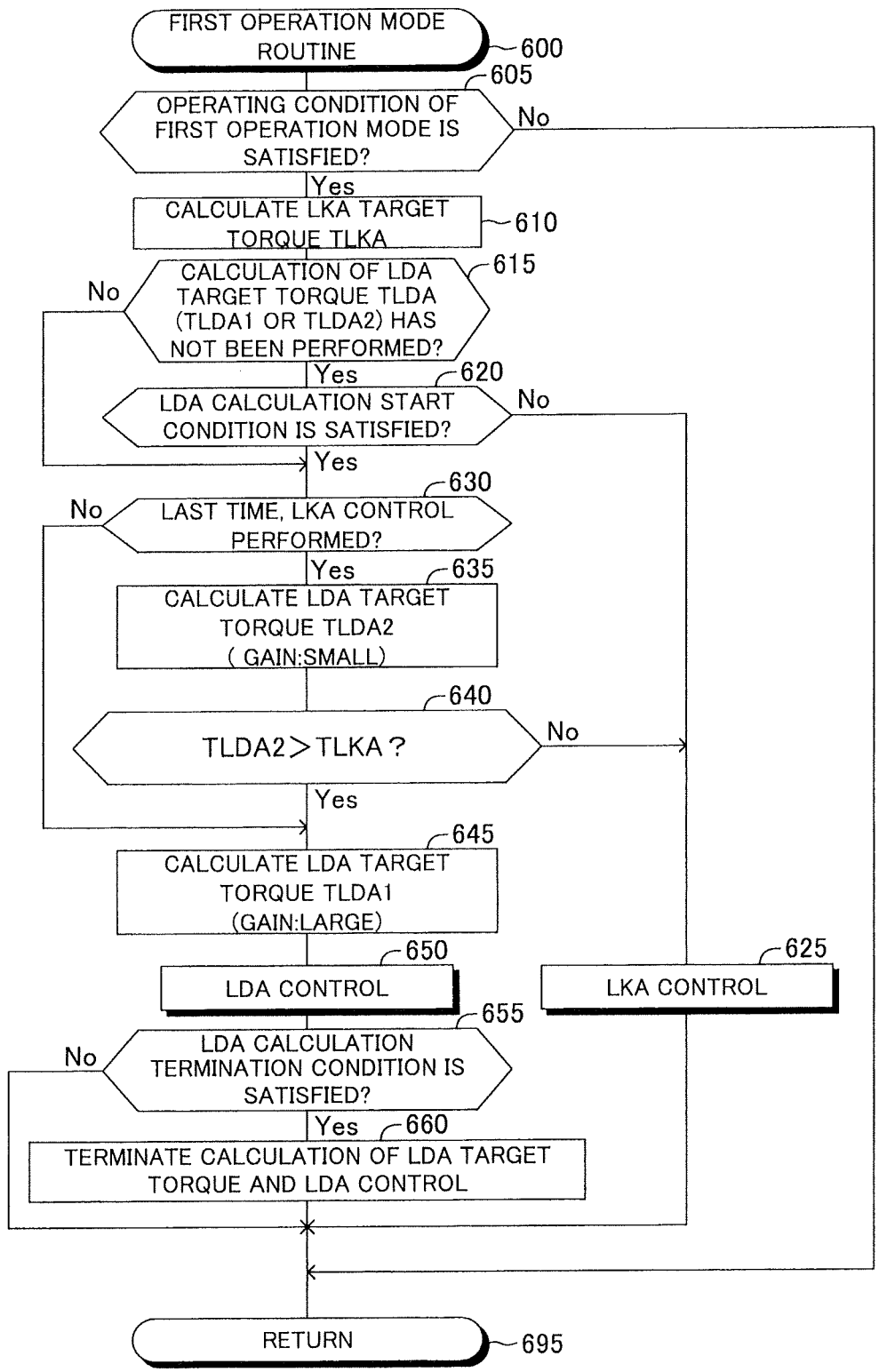
FIG. 6 is a flowchart showing a first operation mode routine executed by a CPU of a driving support ECU.

Therefore, when a predetermined timing arrives, the CPU starts processing from step 600 in FIG. 6 and proceeds to step 605 to determine whether or not the above-described operating condition of the first operation mode is satisfied.

When the operating condition of the first operation mode is satisfied, the CPU makes a "Yes" determination at step 605 and proceeds to step 610 to calculate the LKA target torque TLKA of the LKA control according to the above formula (2). Thereafter, the CPU proceeds to step 615 to determine whether or not the calculation of the LDA target torque TLDA (that is, TLDA1 or TLDA2) is not being repeatedly performed (that is, whether the LDA target torque has not been calculated).

When the LDA target torque has not been calculated, the CPU makes a "Yes (positive)" determination at step 615 and proceeds to step 620 to determine whether or not the above-described LDA calculation start condition (that is, the calculation start condition of the LDA target torque TLDA) is satisfied. When the side distance Ds between the reference point P of the own vehicle C and the white line closer to the reference point P of the left and right white lines becomes shorter than the reference side distance Dsref, the calculation start condition of the LDA target torque TLDA is satisfied.

When the LDA calculation start condition has not become satisfied, the CPU makes a "No" determination at step 620 and proceeds to step 625 to perform the LKA control. That is, the CPU transmits the steering command representing the LKA target torque TLKA calculated at step 610 to the EPS·ECU 20, thereby performing the LKA control. Thereafter, the CPU proceeds to step 695 to tentatively terminate the present routine.

In contrast, when the LDA calculation start condition becomes satisfied, the CPU makes a "Yes" determination at step 620 and proceeds to step 630 to determine whether or not the CPU previously performed the LKA control by the process of step 625 when the CPU executed the present routine last time (in other words, the CPU determines whether or not the LKA control had been performed up to a time point immediately before the present time point). When the LKA control was performed when the present routine was previously performed, the CPU makes a "Yes" determination at step 630 and proceeds to step 635 to calculate the LDA target torque TLDA2 using the same control gains as the gains used in the LDA control under the second operation mode (that is, using the control gains smaller than the control gains of the LDA control under the first operation mode). Thereafter, the CPU proceeds to step 640 to determine whether or not the LDA target torque TLDA2 is greater/larger than the LKA target torque TLKA.

When the LDA target torque TLDA2 is equal to or smaller than the LKA target torque TLKA, the CPU makes a "No" determination at step 640 and proceeds to step 625 to perform the LKA control. That is, the CPU performs the LKA control by transmitting the steering command representing the "LKA target torque TLKA calculated at step 610" to the EPS·ECU 20.

In contrast, when the LDA target torque TLDA2 is greater than the LKA target torque TLKA, the CPU makes a "Yes" determination at step 640 and proceeds to step 645 to calculate (or start to calculate) the LDA target torque TLDA1 using the control gains of the LDA control under the first operation mode (i.e., using the control gains whose absolute values are larger than the control gains of the LDA control under the second operation mode).

Thereafter, the CPU proceeds to step 650 to perform the LDA control. That is, the CPU transmits the steering command representing the "LDA target torque TLDA1 calculated at step 645" to the EPS·ECU 20, thereby performing the LDA control under the first operation mode.

Subsequently, the CPU proceeds to step 655 to determine whether or not the above-described LDA calculation termination condition is satisfied. More specifically, the CPU determines whether or not the "side distance Ds is larger/longer than the reference side distance Dsref, and a size (magnitude) of the yaw angle $\theta y$ is equal to or smaller than a switching determination threshold $\theta yref$", at step 655.

When the above-described LDA calculation termination condition is not satisfied, the CPU makes a "No" determination at step 655 and proceeds to step 695 to tentatively terminate the present routine.

Immediately thereafter, when the CPU again executes the first operation mode routine, the CPU is in an LDA operation state. Thus, the CPU makes a "No (negative)" determination at step 615 and proceeds to step 630. Since the CPU was performing the LDA control instead of the LKA control immediately before the present time point, the CPU makes a "No" determination at step 630 and proceeds to step 645 to calculate the LDA target torque TLDA1. Thereafter, the CPU proceeds to step 650 to perform the LDA control, and then performs appropriate processes of step 655 and step 660. Thereafter, the CPU proceeds to step 695 to tentatively terminate the present routine.

When the LDA calculation termination condition has become satisfied at the time point at which the CPU performs the process of step 655, the CPU makes a "Yes" determination at step 655 and proceeds to step 660 to terminate calculating the LDA target torque (TLDA1 and/or TLDA2) and to terminate the LDA control. Thereafter, the CPU proceeds to step 695 to tentatively terminate the present routine. When the CPU again execute the first operation mode routine immediately thereafter, the CPU already finished/terminated the calculation of the LDA target torque before this time point. Therefore, the CPU makes a "Yes" determination at step 615 and proceeds to step 620. When the LDA calculation start condition is not satisfied (note that, in general, the LDA calculation start condition does not become satisfied immediately after the LDA calculation termination condition became satisfied), the CPU proceeds to step 625. Therefore, the LKA control is performed.

Further, when the operation condition of the first operation mode is not satisfied at the time point at which the process of step 605 is executed, the CPU makes a "No" determination at step 605 and proceeds directly to step 695 to tentatively terminate the present routine.

Figure 7:
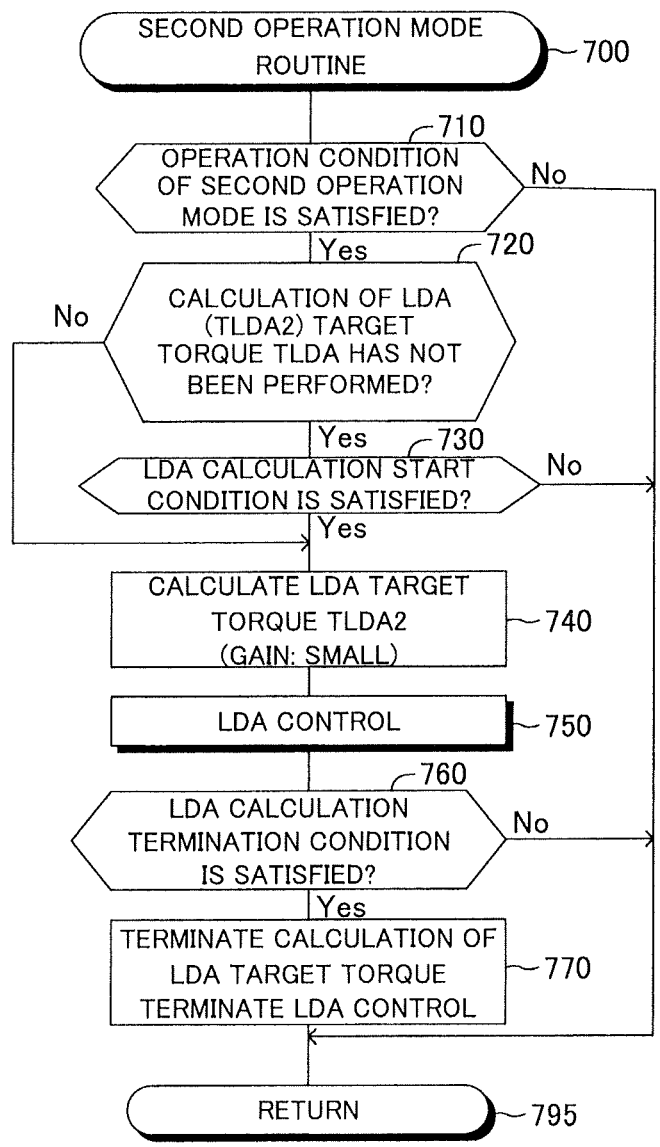
FIG. 7 is a flowchart showing a second operation mode routine executed by the CPU of the driving support ECU.

In the mean time, when a predetermined timing arrives, the CPU starts processing from step 700 of the second operation mode routine shown in FIG. 7, and proceeds to step 710 to determine whether or not the operation condition of the second operation mode is satisfied. When the operating conditions of the second operation mode is not satisfied, the CPU makes a "No" determination at step 710 and proceeds directly to step 795 to tentatively terminate the present routine.

When the operating conditions of the second operation mode is satisfied, the CPU makes a "Yes" determination at step 710 and proceeds to step 720 to determine whether or not the calculation of the LDA (that is, TLDA2) target torque TLDA is not being repeatedly performed (that is, whether the LDA target torque calculation has not been performed).

When the LDA target torque has not been calculated, the CPU makes a "Yes" determination at step 720 and proceeds to step 730 to determine whether or not the above LDA calculation start condition (that is, calculation start condition of LDA target torque TLDA) is satisfied.

When the LDA calculation start condition becomes satisfied, the CPU makes a "Yes" determination at step 730 and proceeds to step 740 to start the calculation of the LDA target torque TLDA2 using the control gains of the LDA control under the second operation mode (that is, using the control gains whose absolute values are smaller than the control gains of the LDA control under the first operation mode). Thereafter, the CPU proceeds to step 750 to transmit the steering command representing the "LDA target torque TLDA2 calculated at step 740" to the EPS·ECU 20, thereby performing the LDA control.

Thereafter, the CPU proceeds to step 760 to determine whether or not the above LDA calculation termination condition is satisfied. When the LDA calculation termination condition is not satisfied, the CPU makes a "No" determination at step 760 and directly proceeds to step 795 to tentatively terminate the present routine.

Immediately thereafter, when the CPU again executes the second operation mode routine, the CPU continues to calculate the LDA target torque TLDA2 (TLDA2 has been calculated). Therefore, the CPU makes a "No" determination at step 720 and proceeds directly to step 740 to calculate the LDA target torque TLDA2. Thereafter, the CPU proceeds to step 750 to perform the LDA control.

In contrast, when the LDA calculation termination condition becomes satisfied at the time point at which the CPU executes the process of step 760, the CPU makes a "Yes" determination at step 760 and proceeds to step 770 to terminate calculating the LDA target torque (TLDA2). Thereafter, the CPU proceeds to step 795 to tentatively terminate the present routine. Immediately thereafter, when the CPU again executes the second operation mode routine, the CPU already finished/terminated the calculation of the LDA target torque before this time point. Therefore, the CPU makes a "Yes" determination at step 720 and proceeds to step 730. When the LDA calculation start condition is not satisfied (note that, in general, the LDA calculation start condition does not become satisfied immediately after the LDA calculation termination condition became satisfied), the CPU makes a "No" determination at step 730 and proceeds directly to step 795 to tentatively terminate the present routine.

As described above, the first apparatus has the following effects. That is, the LDA control performed under the first operation mode by the first apparatus after being switched from the LKA control has the responsiveness such that the movement of the steering wheel and the behavior of the vehicle at the time of performing the steering assist control according to the LDA control cause the driver to have a sudden feeling a sense of discomfort.

Therefore, the first apparatus can cause the driver to have a sudden feeling a sense of discomfort due to the movement of the steering wheel and the vehicle behavior when it performs the steering assist control so that the first apparatus can inform the driver that the steering assist control is switched from the LKA control to the LDA control and the LDA control control is performing instead of the LKA control. Thereby, the first apparatus can have the driver recognize that the LDA control is being performed. As a result, the first apparatus can reduce the possibility of causing the driver to overestimate the LKA control function.

Second Embodiment

Next, a lane keeping traveling support apparatus according to the second embodiment of the present invention (hereinafter, referred to as a "second apparatus") will be described. The second apparatus differs from the first apparatus only in the following respects.

The second apparatus switches the display images when the steering assist control for the lane keeping traveling support is switched from the LKA control to the LDA control while working under the first operation mode.

Thereby, the second apparatus makes a notification/alert appealing to the vision (eye) of the driver.

Thereby, the second apparatus makes the driver recognize that the LDA control is being performed. Hereinafter, this difference will be mainly described.

<Outline of Operation>

When the driving support ECU 10 of the second apparatus switches the steering assist controls for the lane keeping traveling support from the LKA control to the LDA control while working under the first operation mode, it switches the images to be displayed on the display unit 70 from an image (first image) indicating that the LKA control is being performed to an image (second image which is different from the first image) indicating that the LDA control is being performed.

Figure 8A:
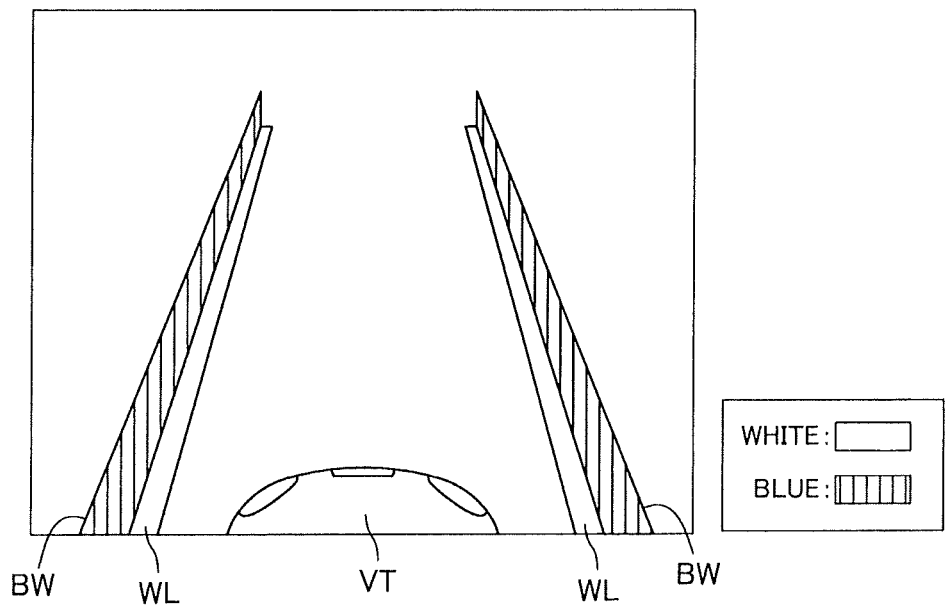
FIG. 8A is a schematic diagram showing an example of display image.

More specifically, when the driving support ECU 10 of the second apparatus is performing the LKA control while working under the first operation mode, the driving support ECU 10 displays the first image shown in FIG. 8A (an image showing that the LKA control is being performed) on the display unit 70. In the first image shown in FIG. 8A, a front end portion VT (a first image portion) of the vehicle is shown at an area in the vicinity of the lower end of the center portion of the image, two white lines WL (a second image portion and a third image portion) are shown at right and left sides of the front end portion VT, and further, blue walls BW (a fourth image portion and a fifth image portion) are shown at outer sides of the white lines WL.

Figure 8B:
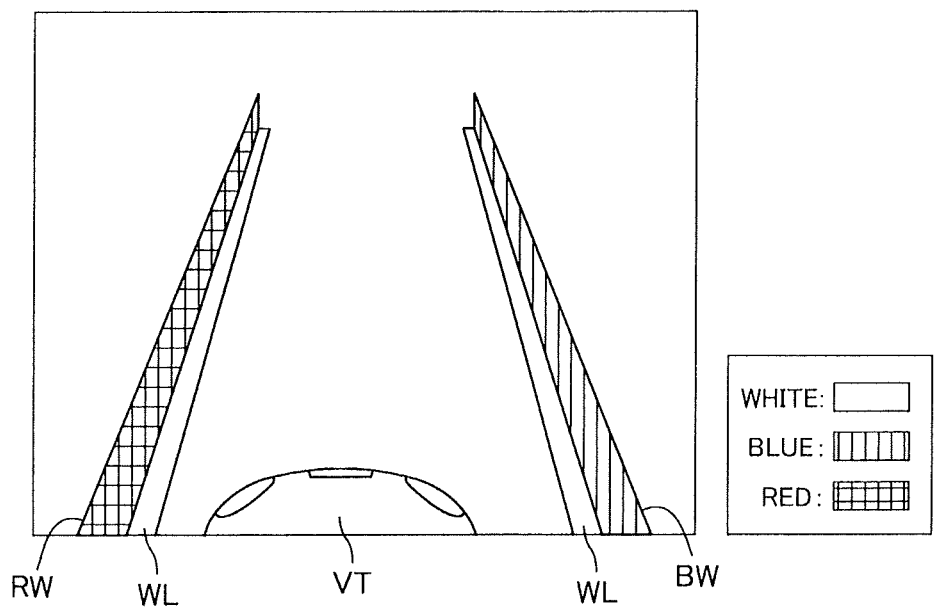
FIG. 8B is a schematic diagram showing an example of display image.

Furthermore, when the driving support ECU 10 switches the steering assist controls for the lane keeping traveling support from the LKA control to the LDA control while working under the first operation mode, the driving support ECU 10 displays the second image shown in FIG. 8B (an image indicating that the LDA control is being performed) on the display unit 70, as long as the LDA control is being performed. It should be noted that FIG. 8B illustrates an image when the own vehicle approaches the white line on the left side. In the image shown in FIG. 8A, the front end portion VT (the first image portion) of the vehicle is shown at the area in the vicinity of the lower end of the center portion of the image, the two white lines WL (the second image portion and the third image portion) are shown at the right and left sides of the front end portion VT. Furthermore, in the image shown in FIG. 8B, a red wall RW (the fourth image portion) is shown at a position adjacent to and outside of one of the white lines WL to which the own vehicle comes closer (the one of the white lines WL is the second image portion in the present example, that is, the one of the white lines WL is the objective white line which is the above described deviation avoidance target). In addition, in the image shown in FIG. 8B, a blue wall BW (the fifth image portion) is shown at a position adjacent to and outside of a white line WS opposite to the objective white line. Therefore, when the own vehicle comes closer to the right side white line (corresponding to the third image portion), and. thus, the right side white line becomes the objective white line, the red wall RW (the fifth image portion) is displayed at the right side and the blue wall BW (the fourth image portion) is displayed at the left side.

It should be noted that the image indicating that the LKA control is being performed and the image indicating that the LDA control is being performed are not limited to the images shown in FIG. 8A and in FIG. 8B, and various images can be adopted. For example, as the image indicating that the LDA control is being performed, an image including a left side wall (the wall adjacent to the objective white line) which is taller than the wall shown in FIG. 8A may be adopted, in place of the image shown in FIG. 8B.

<Specific Operation>

Figure 9:
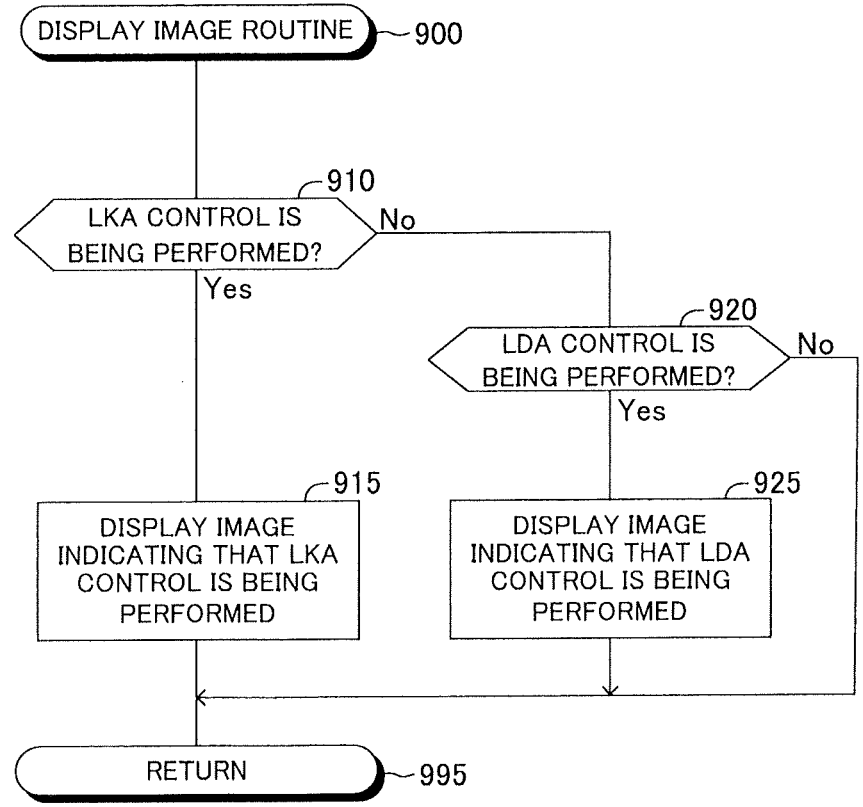
FIG. 9 is a flowchart showing a display image routine executed by the CPU of the driving support ECU of a second embodiment.

Next, a specific operation of the CPU of the driving support ECU 10 (hereinafter simply referred to as the "CPU") of the second apparatus will be described. When the driving support ECU 10 recognizes that the operation switch 50 is at the ON position, the CPU executes each of the same first operation mode routine as the routine shown in FIG. 6, the same second operation mode routine as the routine shown in FIG. 7, and a display image routine shown in FIG. 9, every time the predetermined time elapses. The routines shown in FIGS. 6 and 7 have been already described. Therefore, the operation of the CPU will be described with reference to FIG. 9.

When the predetermined timing arrives, the CPU starts processing from step 900 of the display image routine and proceeds to step 910 to determine whether or not the LKA control is being performed.

When the LKA control is being performed, the CPU makes a "Yes" determination at step 910 and proceeds to step 915 to display the image (the image shown in FIG. 8A) indicating that the LKA control is being performed on the display unit 70.

In contrast, when the LKA control is not being performed, the CPU makes a "No" determination at step 910 and proceeds to step 920 to determine whether or not the LDA control is being performed. When the LDA control is being performed, the CPU makes a "Yes" determination at step 920 and proceeds to step 925 to display the image indicating that the LDA control is being performed (the image shown in FIG. 8B) on the display unit 70. Thereafter, the CPU proceeds to step 995 to tentatively terminate the present routine.

When the LDA control is not being performed, the CPU makes a "No" determination at step 920 and proceeds to step 995 to tentatively terminate the present routine. In this case, neither the image indicating the LDA control is being performed nor the image indicating the LKA control is being performed is displayed on the display unit 70.

As described above, the second apparatus has the following effects. That is, when the second apparatus switches the steering assist controls from the LKA control to the LDA control to perform the LDA control, the second apparatus switches images from the image indicating that the LKA control is being performed to the image indicating that the LDA control is being performed. The image indicating that the LDA control is being performed is different from the image indicating that the LKA control is being performed.

Thereby, the notification (alert) appealing to the eye of the driver owing to the displayed image is added to the the sudden rotation of the steering wheel and the sudden change in the vehicle behavior, when the steering assist control is switched from the LKA control to the LDA control. Thus, the second apparatus can have the driver more easily recognize that the LDA control is being performed. As a result, the second apparatus can reduce the possibility of causing the driver to overestimate the LKA control function.

Third Embodiment

Next, a lane keeping traveling support apparatus according to the third embodiment of the present invention (hereinafter, referred to as a "third apparatus") will be described. The third apparatus differs from the first apparatus only in the following respects. The third apparatus returns the operation switch 50 to the OFF position (that is, the third apparatus recognizes that the operation switch 50 becomes in the OFF state) when it terminates the LDA control (that is, when the LDA calculation termination condition becomes satisfied) after the third apparatus switched the steering assist controls from the from the LKA control to the LDA control under the first mode. Thus, the third apparatus performs neither the LKA control nor the LDA control (i.e., it does not perform the lane keeping traveling support) unless the operation switch 50 is pressed again to be moved to the ON position after it terminated the LDA control. Hereinafter, this difference will be mainly described. It should be noted that this difference (feature) of the third apparatus may be applied to the second apparatus.

<Outline of Operation>

When the third apparatus performs the LDA control instead of the LKA control and then terminates the LDA control under the first operation mode, the third apparatus does not perform the lane keeping traveling support (specifically, the LKA control) thereafter. Thereby, since the LKA control is not performed, the driver has to perform a handle operation to accurately impart a relatively large torque to the steering wheel by himself/herself in order to have the own vehicle travel in the lane (or travel at a center position of the lane). Therefore, third apparatus can cause the driver to feel discomfort after the termination of the LDA control, to thereby be able to have the driver recognize that the LDA control has been terminated.

<Specific Operation>

Next, a specific operation of the CPU of the driving support ECU 10 (hereinafter simply referred to as the "CPU") of the third apparatus will be described. When the driving support ECU 10 recognizes that the operation switch 50 is at the ON position, the CPU executes each of a first operation mode routine shown in FIG. 10, and the second operation mode routine which is the same as the routine shown in FIG. 7, every time the predetermined time elapses. The routine shown in FIG. 7 has been already described. Therefore, the operation of the CPU will be described below with reference to FIG. 10.

Figure 10:
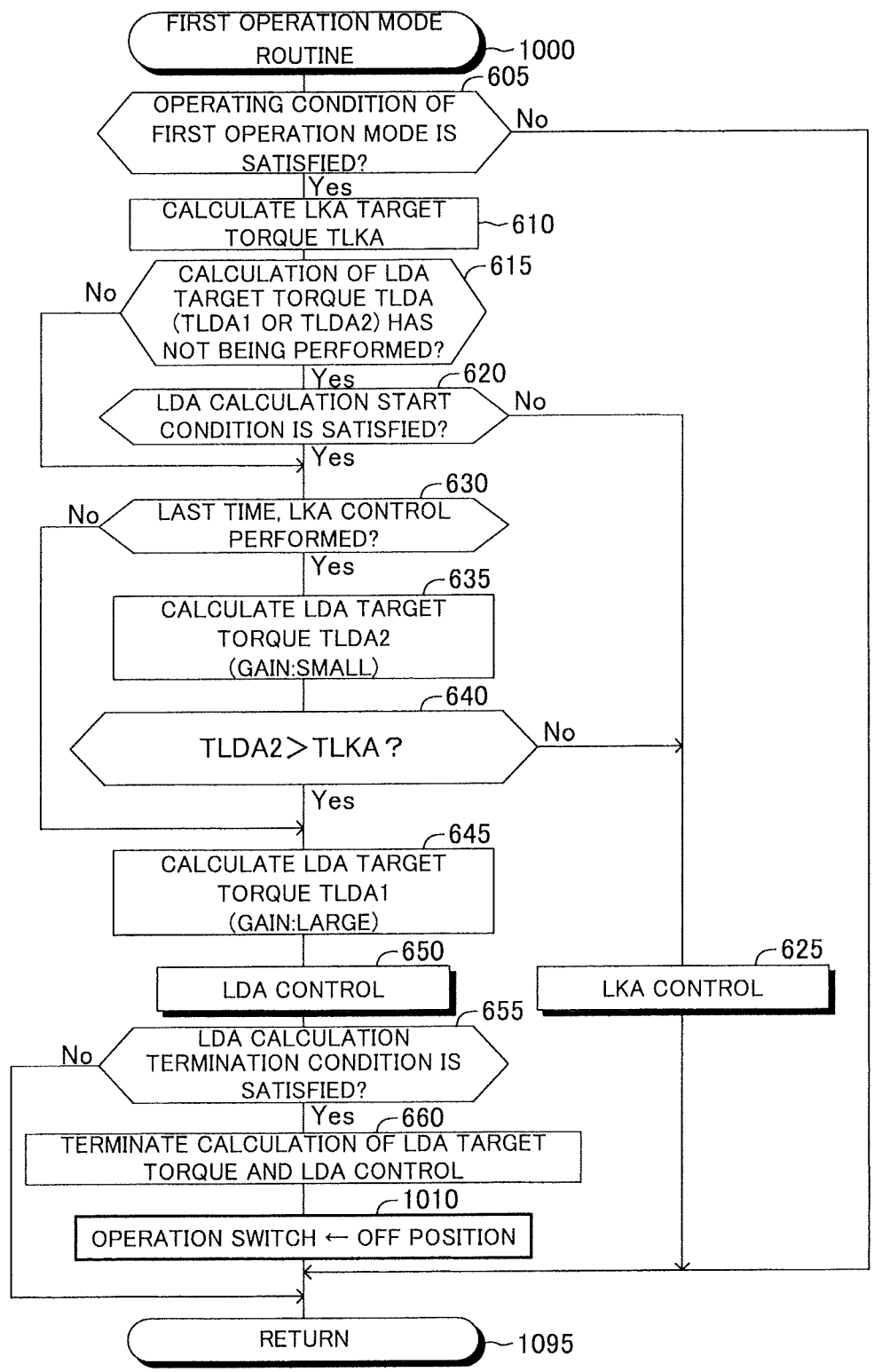
FIG. 10 is a flowchart showing a first operation mode routine executed by the CPU of the driving support ECU of a third embodiment.

The first operation mode routine shown in FIG. 10 differs from the routine shown in FIG. 6 only in that step 1010 is inserted between step 660 and step 695 of the routine shown in FIG. 6. Therefore, this difference will be mainly described.

After the CPU carries out the appropriate processes out of the steps shown in FIG. 10, the CPU proceeds to step 660 to terminate the calculation of the LDA target torque to terminate the LDA control. Thereafter, the CPU proceeds to step 1010 to change positions of the operation switch 50 to the OFF position, and to recognize that the operation switch 50 is at the OFF position. As a result, the CPU starts neither the first operation mode routine shown in FIG. 10 nor the second operation mode routine shown in FIG. 7. Thereby, the lane keeping traveling support (lane keeping assist) is stopped. In this manner, after the LDA control is terminated under the first operation mode, the LKA control is not performed. In this case, in order to have the driver recognize that the lane keeping traveling support has been stopped, an image indicating that the lane keeping traveling support has stopped may be displayed on the display unit 70 or the buzzer 60 may be blown. Thereafter, the CPU proceeds to step 1095 to tentatively terminate the present routine.

According to the above-described third apparatus, the LKA control is not performed in a period from a time point immediately after the LDA control is terminated after the switch-over from the LKA control to the LDA control to a time point at which the operation switch 50 is again turned on to be at the ON position by the driver. Therefore, for that period, the driver has to perform a handle operation to accurately impart a relatively large torque to the steering wheel by himself/herself in order to have the own vehicle travel in the lane (or travel at a center position of the lane). Therefore, the third apparatus can cause the driver to feel discomfort so as to notify/alert the driver of the termination of the LDA control. As a result, the third apparatus can have the driver recognize that the LDA control, which has been performed after the switch-over from the LKA control to that LDA control, has been terminated. Thereby, the third apparatus can have the driver grasp the function of the LDA control more accurately, and can further reduce the possibility of causing the driver to overestimate the LKA control function.

Fourth Embodiment

Next, a lane keeping traveling support apparatus according to the fourth embodiment of the present invention (hereinafter, referred to as a "fourth apparatus") will be described. The fourth apparatus differs from the first apparatus only in the following respects. The fourth apparatus restarts the lane keeping traveling support (specifically, the LKA control) after it stops the lane keeping traveling support (the LKA control and the LDA control) for a predetermined period from a time point at which it terminated the LDA control which had been performed after the change-over of the lane keeping traveling support from the LKA control to the LDA control under the first operation mode. Hereinafter, this difference will be mainly described. It should be noted that the difference (feature) of the fourth apparatus may be applied to the second apparatus.

<Outline of Operation>

When the fourth apparatus is working under the first operation mode, the fourth apparatus performs the LDA control when necessary instead of the LKA control. Thereafter, when the LDA control is terminated, the fourth apparatus stops performing the lane keeping traveling support (specifically, the LKA control) for the predetermined period. Thereby, since the LKA control is not performed for that period, the driver has to perform a handle operation to accurately impart a relatively large torque to the steering wheel by himself/herself in order to have the own vehicle travel in the lane (or travel at a center position of the lane). Therefore, the fourth apparatus can cause the driver to feel discomfort after the termination of the LDA control, so as to be able to have the driver recognize that the LDA control has stopped.

<Specific Operation>

Next, a specific operation of the CPU of the driving support ECU 10 (hereinafter simply referred to as the "CPU") of the fourth apparatus will be described. When the driving support ECU 10 recognizes that the operation switch 50 is at the ON position, the CPU executes each of a first operation mode routine shown in FIG. 11, and the second operation mode routine which is the same as the routine shown in FIG. 7. The routine shown in FIG. 7 has been already described. Therefore, the operation of the CPU will be described with reference to FIG. 11.

Figure 11:
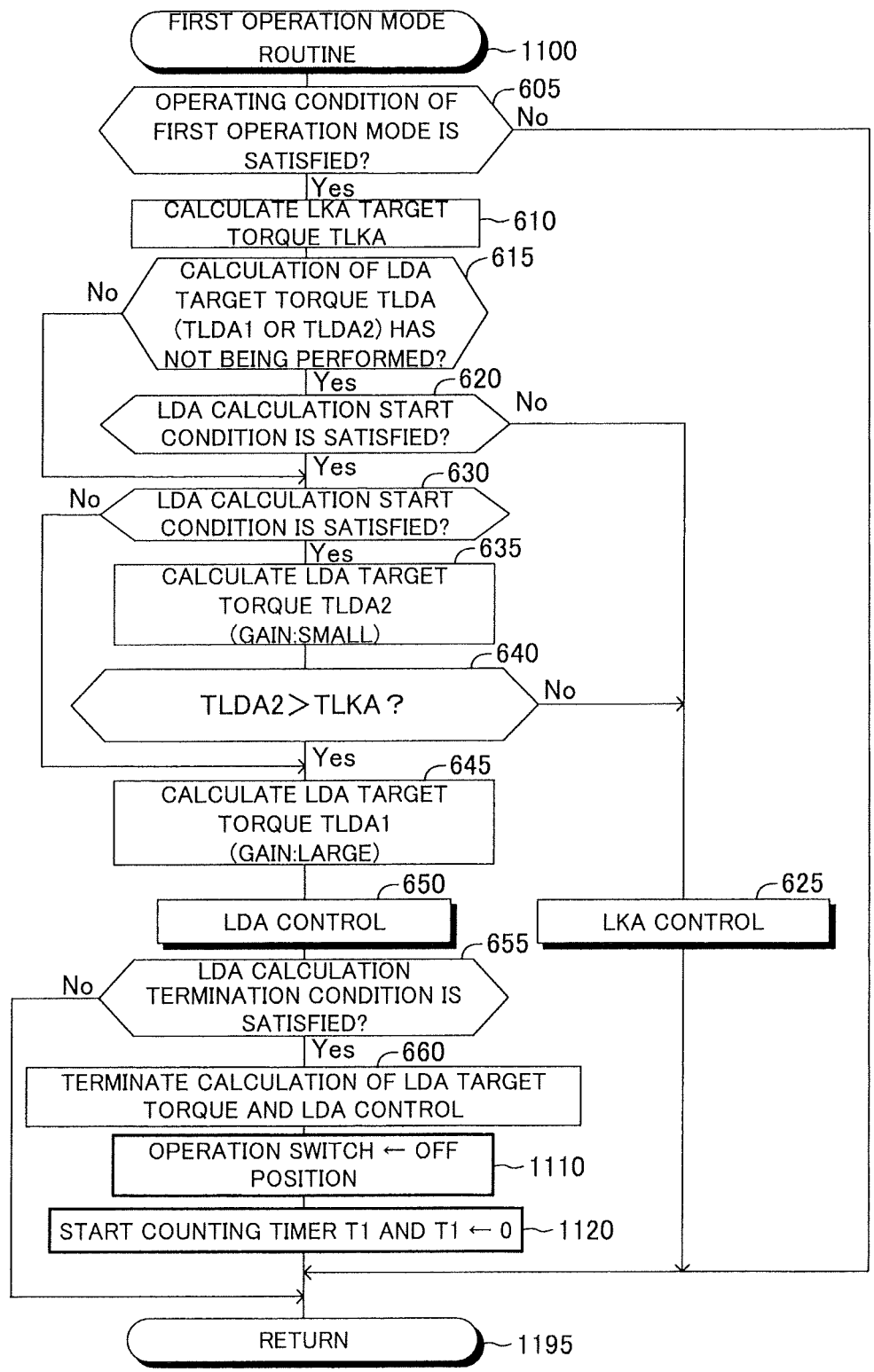
FIG. 11 is a flowchart showing a first operation mode routine executed by a CPU of a driving support ECU of a fourth embodiment.

The first operation mode routine shown in FIG. 11 differs from the routine shown in FIG. 6 only in that step 1110 and step 1120 are inserted between step 660 and step 695 of the routine shown in FIG. 6. Therefore, those differences will be mainly described below.

After the CPU executes the appropriate processes of the steps shown in FIG. 11, the CPU proceeds to step 660 to terminate the calculation of the LDA target torque and to terminate the LDA control. Thereafter, the CPU proceeds to step 1110 to change positions of the operation switch 50 to the OFF position, and to recognize that the operation switch 50 is at the OFF position. As a result, the CPU performs neither the first operation mode routine shown in FIG. 11 nor the second operation mode routine shown in FIG. 7. Thereby, the lane keeping traveling support (lane keeping assist) is stopped. In this case, in order to have the driver recognize that the lane keeping assist is stopped, the image indicating that the lane keeping assist has been terminated may be displayed on the display unit 70 or the buzzer 60 may be blown. Thereafter, the CPU proceeds to step 1120 to start counting a time by a timer t1 and sets (clears) the timer t1 to "0". This allows the CPU to execute a timer routine shown in FIG. 12 every time a predetermined time elapses. Thereafter, the CPU proceeds to step 1195 to tentatively terminate the present routine.

Figure 12:
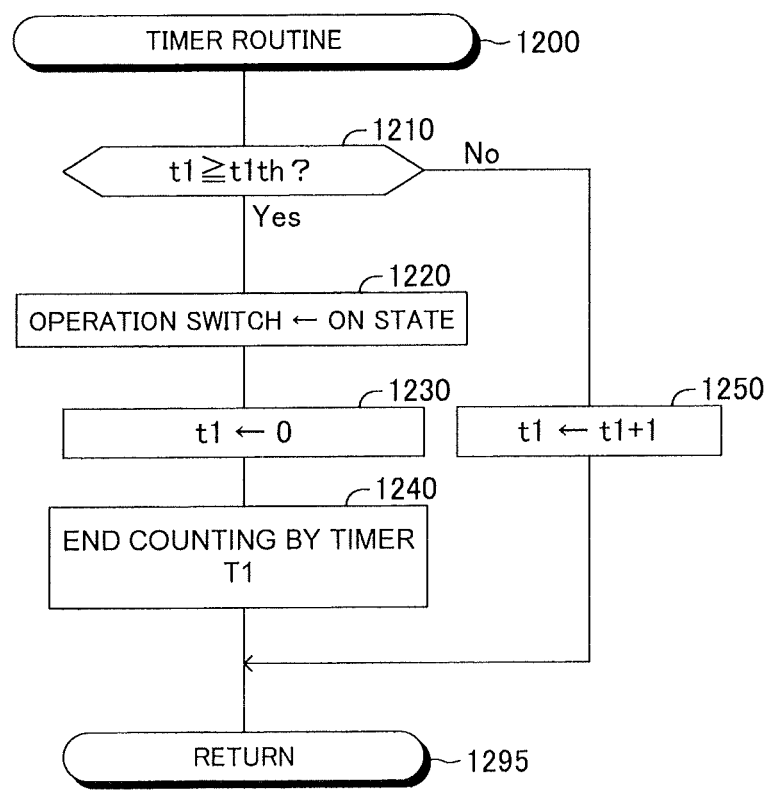
FIG. 12 is a flowchart showing a timer routine executed by the CPU of the driving support ECU of the fourth embodiment.

When counting the time by the timer t1 is started at step 1120, the CPU executes the timer routine shown in FIG. 12 every time the predetermined time elapses. Therefore, when a predetermined timing arrives after the counting of the time by the timer t1 is started, the CPU starts the process from the step 1200 and proceeds to the step 1210 to determine whether or not the count of the timer t1 is equal to or larger than a predetermined time (threshold time) t1*th* set in advance. It should be noted that the predetermined time t1*th* is larger than 0, and is a value that defines a period during which the lane keeping traveling support (specifically, the LKA control) continues to be stopped.

When the count of the timer t1 is smaller than the predetermined time t1*th*, the CPU makes a "No" determination at step 1210 and proceeds to step 1250 to increase the value (count) of the timer t1 by "1". Thereafter, the CPU proceeds to step 1295 to tentatively terminate the present routine. In this manner, the value of the timer t1 gradually increases as the process of step 1250 is repeated every predetermined time.

In contrast, when the count (value) of the timer t1 becomes equal to or larger than the predetermined time t1*th* at the time point at which the CPU executes the process of step 1210, the CPU makes a "Yes" determination at step 1210, and performs the processes of steps 1220 to 1240 described below, and to proceed to step 1295 to tentatively terminate the present routine.

Step 1220: the CPU changes positions of the operation switch 50 to the ON position and recognizes that the operation switch 50 is at the ON state. As a result, the CPU resumes executing the first operation mode routine shown in FIG. 11 and the second operation mode routine shown in FIG. 7. Thereby, the lane keeping support (the LKA control or the LDA control) is resumed.

Step 1230: the CPU sets (clears) the value (count) of the timer t1 to "0".

Step 1240: the CPU ends counting by the timer t1.

According to the above-described fourth apparatus, the following effects are obtained. The fourth apparatus does not perform the LKA control for the predetermined period immediately after it terminates the LDA control after the change-over from the LKA control to the LDA control. Thus, in that predetermined period, the driver has to perform a handle operation to accurately impart a relatively large torque to the steering wheel by himself/herself in order to have the own vehicle travel in the lane (or travel at a center position of the lane). Accordingly, the fourth apparatus can cause the driver to feel discomfort so as to notify the driver of the termination of the LDA control. As a result, the fourth apparatus can have the driver grasp the function of the LDA control more accurately, and can further reduce the possibility of causing the driver to overestimate the LKA control function.

Modified Examples

Although each of the embodiments of the present invention has been specifically described above, the present invention is not limited to the above embodiments, and various modified examples based on the technical idea within the scope of the present invention can be adopted.

Each of the second apparatus, the third apparatus, and the fourth apparatus may be configured to unify the control gains of the LDA control under the first operation mode and the control gains of the LDA control under the second operation mode into the control gains of the LDA control under the second operation mode. More specifically, each of the second apparatus, the third apparatus, and the fourth apparatus may use the LDA target torque TLDA2 which is calculated using the control gains of the LDA control under the second operation mode for not only the LDA control under the second operation mode but also the LDA control under the first operation mode. In this case, in each of the second apparatus, the third apparatus, and the fourth apparatus, a function is omitted, wherein the function is a function to inform the driver to have the driver recognize that the LDA control is being performed owing to the sudden change in the movement of the steering wheel and the sudden change in the vehicle behavior, when the LDA control is being performed after the change-over from the LKA control to the LDA control under the first operation mode.

What is claimed is:

1. A lane keeping traveling support apparatus comprising:
an electric motor that applies a steering assist torque to a steering mechanism including a steering wheel of an own vehicle; and
a controller configured to:
perform a lane keeping assist control to apply a steering assist torque to have said own vehicle travel along a target traveling line to said steering mechanism by using said electric motor and
perform a lane departure prevention control:
to determine a steering assist torque to prevent said own vehicle from deviating from a traveling lane by multiplying a parameter by a control gain, said parameter having an absolute value which becomes larger as a possibility that said own vehicle deviates from said traveling lane increases, when a first event occurs in which said own vehicle is likely to deviate outside of said traveling lane; and
to apply said determined steering assist torque to said steering mechanism by using said electric motor,
said controller being further configured to:
select, in accordance with a traveling situation of said own vehicle, one of a first operation mode and a second operation mode,
said first operation mode being an operation mode under which said lane keeping assist control and said lane departure prevention control are permitted to be performed, and said lane departure prevention control is performed in place of said lane keeping assist control when said first event occurs while said lane keeping assist control is being performed, and
said second operation mode being an operation mode under which only said lane departure prevention control, out of said lane keeping assist control and said lane departure prevention control, is permitted to be performed, and said lane departure prevention control is performed when said first event occurs; and
work under said selected operation mode,
wherein,
said controller is configured to make responsiveness of said lane departure prevention control under said first operation mode higher than responsiveness of said lane departure prevention control under said second operation mode by setting an absolute value of said control gain used in said lane departure prevention control performed under said first operation mode to a value larger than an absolute value of said control gain used in said lane departure prevention control performed under said second operation mode.

2. The lane keeping traveling support apparatus according to claim 1, further comprising a display to display an image representing an execution state of said lane keeping assist control or said lane departure prevention control,
wherein,
said controller is configured to:
switch said image to be displayed on said display from a first image indicating that said lane keeping assist control is being performed to a second image indicating that said lane departure prevention control is being performed when said controller performs said lane departure prevention control instead of said lane keeping assist control; and
continue to display said second image during a period during which said control unit is performing said lane departure prevention control,
wherein,
said first image includes:
a first image portion representing a portion including a front end portion of a vehicle, positioned at a lower end of a central portion of an entire image,
a second image portion representing a left side lane marker, positioned at a left side of said first image portion,
a third image portion representing a right side lane marker, positioned at a right side of said first image portion,
a fourth image portion representing a left side wall, said fourth image portion being adjacent to said second image portion and extending upward from a left side position of said second image portion, and
a fifth image portion representing a right side wall, said fifth image portion being adjacent to said third image portion and extending upward from a right side position of said third image portion; and
said second image
includes said first image portion to said fifth image portion, and
is an image in which at least one of a color and a shape of one specified image portion of said fourth image portion and said fifth image portion is changed so as to be different from an image portion corresponding to said one specified image in said first image, said one specified image representing a side wall at a side of one of said right and left lane markers which is determined to be a marker from which said own vehicle is about to deviate in said lane departure prevention control.

3. The lane keeping traveling support apparatus according to claim 1, further comprising an operation switch to be operated to be in an ON state or in an OFF state to determine whether to permit said lane keeping assist control and said lane departure prevention control to be performed, wherein, said controller is configured to have a state of said operation switch be in said OFF state from a time point at which said controller terminates said lane departure prevention control under said first operation mode so as not to permit said lane keeping assist control to be performed until said operation switch is again turned on to be in said ON state by a driver.

4. The lane keeping traveling support apparatus according to claim 1, wherein, said controller is configured to inhibit performance of said lane keeping assist control for a predetermined period of time from a time point immediately after terminating said lane departure prevention control under said first operation mode.

* * * * *